United States Patent
Simon

(10) Patent No.: US 7,532,857 B2
(45) Date of Patent: May 12, 2009

(54) APPARATUS, SYSTEMS AND METHODS FOR PROVIDING TIME DIVERSITY FOR MOBILE BROADCAST SERVICES

(75) Inventor: Michael Simon, Frederick, MD (US)

(73) Assignee: Rohde & Schwarz GmbH & Co. KG, Munich (DE)

( * ) Notice: Subject to any disclaimer, the term of this patent is extended or adjusted under 35 U.S.C. 154(b) by 590 days.

(21) Appl. No.: 11/422,791

(22) Filed: Jun. 7, 2006

(65) Prior Publication Data

US 2006/0246836 A1 Nov. 2, 2006

Related U.S. Application Data

(63) Continuation-in-part of application No. 11/379,439, filed on Apr. 20, 2006, which is a continuation-in-part of application No. 11/276,473, filed on Mar. 1, 2006.

(60) Provisional application No. 60/688,070, filed on Jun. 7, 2005, provisional application No. 60/673,101, filed on Apr. 20, 2005, provisional application No. 60/668,094, filed on Apr. 5, 2005, provisional application No. 60/657,416, filed on Mar. 2, 2005.

(51) Int. Cl.
H04H 1/00 (2006.01)

(52) U.S. Cl. .................... 455/3.01; 455/550.1; 375/267; 375/316; 370/276; 370/280

(58) Field of Classification Search ............ 455/3.01–2, 455/73, 130, 550.1, 334; 375/136, 147, 267, 375/347, 316; 270/276, 277, 278, 280, 313, 270/314

See application file for complete search history.

(56) References Cited

U.S. PATENT DOCUMENTS 5,614,914 A * 3/1997 Bolgiano et al. ............ 342/364

(Continued)

FOREIGN PATENT DOCUMENTS

WO 2004062283 A1 7/2004

OTHER PUBLICATIONS

International Search Report and Written Opinion of the International Searching Authority, PCT/US06/07265, Sep. 4, 2007.

(Continued)

Primary Examiner—CongVan Tran
(74) Attorney, Agent, or Firm—Fitzpatrick, Cella, Harper & Scinto

(57) ABSTRACT

Systems, methods, apparatus are provided for providing to a receiver a time diverse digital signal corresponding to a service including receiving a digital signal containing a service content and receiving a digital signal containing a non-deterministic content. The service content is inserted into a first predetermined number of data packets in a first predetermined number of data frames deterministically. In addition, a first portion of the non-deterministic content is inserted into a second predetermined number of data packets in the first predetermined number of data frames. A copy of the first predetermined number of data packets is generated. The first predetermined number of data frames is broadcast over a distribution network. The copy of the first predetermined number of data packets is inserted into a second predetermined number of data frames and a second portion of the non-deterministic content is inserted into the second predetermined number of data frames. The second predetermined number of data frames is broadcast after a predetermined time.

28 Claims, 21 Drawing Sheets

U.S. PATENT DOCUMENTS

| | | | |
|---|---|---|---|
| 6,005,605 A | 12/1999 | Kostreski et al. | |
| 6,088,337 A * | 7/2000 | Eastmond et al. | 370/280 |
| 6,130,898 A | 10/2000 | Kostreski et al. | 370/522 |
| 6,269,092 B1 | 7/2001 | Schilling | |
| 6,313,885 B1 | 11/2001 | Patel et al. | 348/725 |
| 6,477,180 B1 | 11/2002 | Aggarwal et al. | 370/468 |
| 6,480,236 B1 | 11/2002 | Limberg | 348/555 |
| 6,496,477 B1 * | 12/2002 | Perkins et al. | 370/228 |
| 6,721,337 B1 * | 4/2004 | Kroeger et al. | 370/477 |
| 6,772,434 B1 | 8/2004 | Godwin | |
| 6,801,499 B1 * | 10/2004 | Anandakumar et al. | 370/229 |
| 6,930,983 B2 * | 8/2005 | Perkins et al. | 370/252 |
| 7,110,048 B2 | 9/2006 | Weiss | 348/723 |
| 7,349,675 B2 * | 3/2008 | Karr et al. | 455/102 |
| 2002/0001349 A1 | 1/2002 | Bretl et al. | |
| 2002/0097336 A1 | 7/2002 | Oshima | 348/487 |
| 2002/0140867 A1 | 10/2002 | Weiss | 348/723 |
| 2003/0099303 A1 | 5/2003 | Birru et al. | |
| 2003/0201932 A1 | 10/2003 | Rabinowitz et al. | |
| 2004/0062283 A1 | 4/2004 | Takeuchi et al. | |
| 2004/0066736 A1 * | 4/2004 | Kroeger | 370/200 |
| 2004/0160344 A1 | 8/2004 | Bretl et al. | |
| 2004/0240460 A1 | 12/2004 | Hwang et al. | 370/412 |
| 2005/0013249 A1 | 1/2005 | Kong et al. | 370/235 |
| 2005/0074074 A1 | 4/2005 | Limberg | |
| 2005/0259643 A1 | 11/2005 | Chuah et al. | 370/389 |
| 2006/0050770 A1 * | 3/2006 | Wallace et al. | 375/144 |
| 2006/0200852 A1 | 9/2006 | Simon | 725/118 |
| 2006/0200853 A1 | 9/2006 | Simon | 725/118 |
| 2006/0244865 A1 | 11/2006 | Simon | 348/614 |
| 2006/0245516 A1 | 11/2006 | Simon | 375/295 |
| 2007/0066272 A1 | 3/2007 | Vassiliou et al. | |
| 2007/0189410 A1 * | 8/2007 | Zeng | 375/267 |
| 2007/0223612 A1 | 9/2007 | Simon | 375/265 |

OTHER PUBLICATIONS

International Preliminary Report on Patentability and Written Opinion of the International Searching Authority, PCT/US2006/022300, Dec. 27, 2007.

International Search Report and Written Opinion of the International Searching Authority, PCT/US06/20599, Aug. 31, 2007.

International Preliminary Report on Patentability and Written Opinion of the International Application, PCT/US2006/007265, Oct. 4, 2007.

"Digital Video Broadcasting (DVB); DVB mega-frame for Single Frequency Network (SFN) synchronization", European Broadcasting Union, ETSI TS 101 191 v1.4.1 (Jun. 2004).

"ATSC Standard: Synchronization Standard for Distributed Transmission (A/110)", Advanced Television Systems Committee (Jul. 14, 2004).

"ATSC Standard: Synchronization Standard for Distributed Transmission, Revision A (A/110A)", Advanced Television Systems Committee (Jul. 19, 2005).

Whitaker, J. C., "Standard Handbook of Video and Television Engineering", Chapter 17.2 "ATSC DTV Received Systems", pp. 17-63 to 17-99 (2000).

"Lecture 4: Digital Television The DVB transport stream", obtained from http://www.abo.fi/~jbjorkqv/digitv/lect4.pdf (last visited May 4, 2006).

Wang, X. et al., "Transmitter Identification in Distributed Transmission Network and Its Applications in Position Location and a New Data Transmission Scheme", NAB Broadcast Engineering Conference, Las Vegas, NV, p. 511-520 (Apr. 16-21, 2005).

Vogel, W. J., et al., "Propagation Effects and Satellite Radio Design", Paper No. 1445, Maastricht Exhibition and Congress Centre (MECC) Maastricht, the Netherlands, (Aug. 17-24, 2002).

Patel, C. B., et al., "Proposal to ATSC Subcommittee T3/S9 to Provide 8-VSB with a Repetitive-PN1023 Signal for Rapidly and Reliably Initializing Tracking in an Adaptive Equalizer Despite Adverse Multipath Conditions" (Apr. 12, 2001).

Raghunandan, K., "Satellite Digital Audio Radio Service (SDARS) System Architecture and Receiver Review", IEEE (Oct. 27, 2005).

Owen, H., "Proposed Modifications to ATSC Digital Television Standard to Improve Performance in the Face of Dynamic Multipath for both Fixed and Mobile Operation", Sarnoff Corporation, Princeton, NJ (Apr. 2, 2001).

"ATSC Technology Group Report: DTV Signal Reception and Processing Considerations", Doc. T3-600r4, Advanced Television Systems Committee (Sep. 18, 2003).

Proposal for Enhancement of ATSC RF Transmission System (Revision to A/53), submitted by Samsung, Draft ver. 1.0 (Sep. 16, 2004).

Citta, R., et al., "ATSC Transmission System: VSB Tutorial", Zenith Electronics Corporation, Symposium Handout, Montreux Symposium (Jun. 12, 1997).

"ATSC Recommended Practice: Design of Synchronized Multiple Transmitter Networks (A/111)", Advanced Television Systems Committee (Sep. 3, 2004).

Lee, Y., et al., "ATSC Terrestrial Digital Television Broadcasting Using Single Frequency Networks", ETRI Journal, vol. 26, No. 2, pp. 92-100, Apr. 2004.

"ATSC Digital Television Standard (A/53) Revision E", Advanced Television Systems Committee (Dec. 27, 2005).

International Search Report and Written Opinion of the International Searching Authority, PCT/US06/015317, May 14, 2008.

International Search Report and Written Opinion of the International Searching Authority, PCT/US06/07251, May 20, 2008.

* cited by examiner

FIG. 3
Prior Art          300

| Syntax | No. of Bits | Format |
|---|---|---|
| DTx_packet (){ | | |
|     reserved | 8 | 0xFF |
|     for (i=0; i<12; i++) { | | |
|         trellis_code_state | 8 | riuimsbfwp |
|     } | | |
|     synchronization_time_stamp | 24 | uimsbf |
|     maximum_delay | 24 | uimsbf |
|     network_identifier_pattern | 12 | uimsbf |
|     stream_locked_flag | 1 | bslbf |
|     reserved | 1 | '1' |
|     packet_number | 10 | uimsbf |
|     reserved | 32 | 0xFFFFFFFF |
|     tx_group_number | 8 | uimsbf |
|     for (i=0; i<16; i++) { | | |
|         tx_address | 12 | uimsbf |
|         tx_identifier_level | 3 | uimsbf |
|         tx_data_inhibit | 1 | bslbf |
|         tx_time_offset | 16 | tcimsbf |
|         tx_power | 12 | uipfmsbf |
|         reserved | 4 | '1111' |
|     } | | |
|     reserved | 320 | for (i=0; 1<40; i++) 0xFF |
|     DTxP_ECC | 160 | uimsbf |
| } | | |

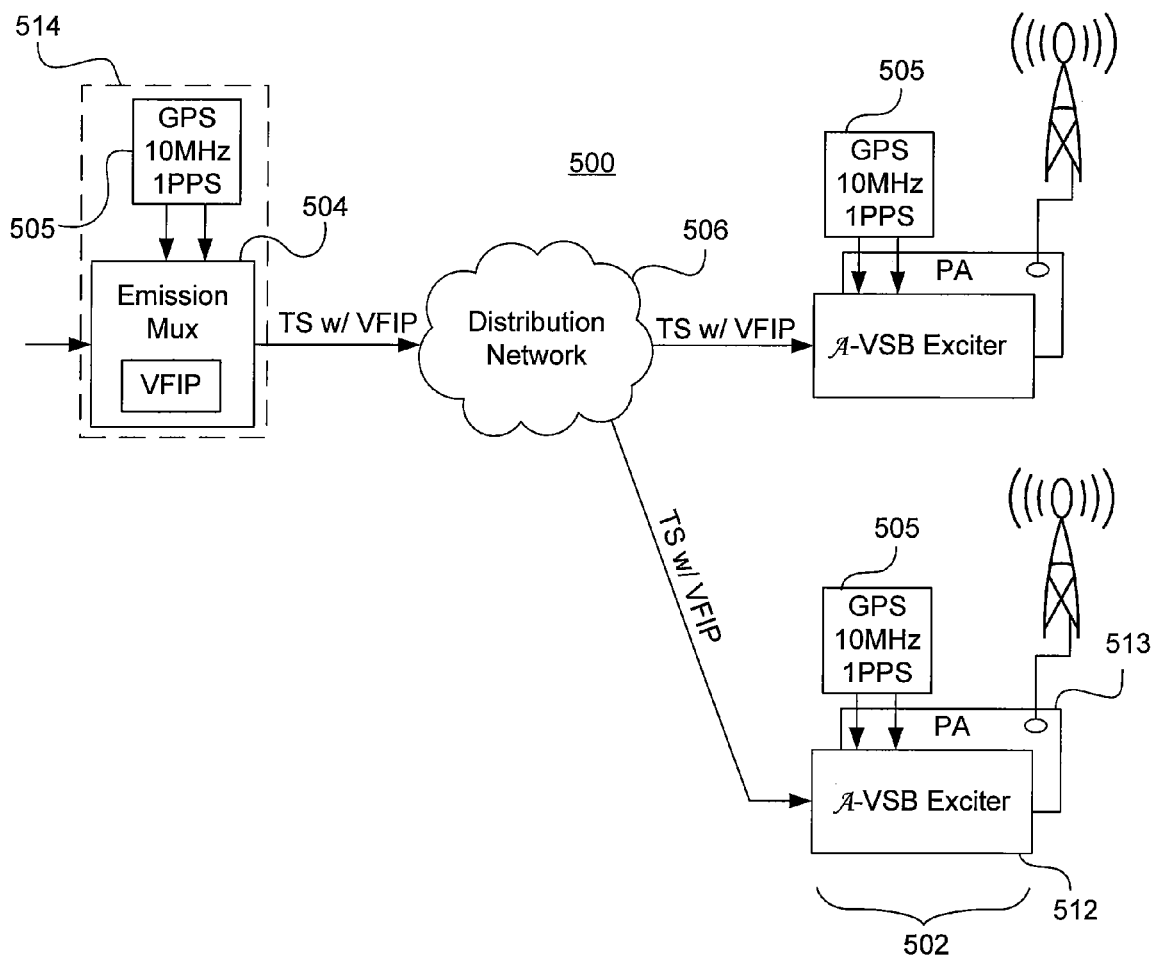

– – –▶ Normal ATSC Lateral R-S Coding

——▶ Enhanced Outer 2D R-S Coding

FIG. 17  Concept SRS (EQ Training) & 2D R-S

APPARATUS, SYSTEMS AND METHODS FOR PROVIDING TIME DIVERSITY FOR MOBILE BROADCAST SERVICES

CROSS REFERENCE TO RELATED APPLICATIONS

This application is a continuation-in-part of U.S. patent application Ser. No. 11/379,439, filed Apr. 20, 2006 ("the '439 application"), which is a continuation-in-part of U.S. patent application Ser. No. 11/276,473 filed Mar. 1, 2006 ("the '473 application"); the '473 application, the '439 application, and this, claim priority to, and the benefit of, U.S. Provisional Application Ser. No. 60/657,416, filed Mar. 2, 2005, and U.S. Provisional Application Ser. No. 60/668,094, filed Apr. 5, 2005; the '439 application, and this, also claim priority to, and benefit of, U.S. Provisional Application Ser. No. 60/673,101, filed Apr. 20, 2005; and this application also claims priority to, and the benefit of, U.S. Provisional Application Ser. No. 60/688,070, filed Jun. 7, 2005; all of the mentioned prior applications are hereby incorporated herein by reference in their entirety.

BACKGROUND OF THE INVENTION

1. Field of the Invention

The present invention generally relates to broadcasting networks, and more particularly to technology for providing time diversity for mobile broadcast services.

2. Related Art

A single-frequency network (SFN) is a collection of transmitters operating on the same frequency for carrying the same information to receivers in a given area. The transmitters emit identical signals, several of which may be received more or less simultaneously by individual receivers. One advantage of using multiple transmitters instead of one powerful transmitter is that multiple transmitters provide alternate paths for the signal to enter a structure, such as a house, thereby providing better reception. In mountainous areas, for example, it may be difficult to find one location capable of serving all the population centers in the area, since they are often located in valleys. Multiple transmitters can be strategically placed to cover such small areas and fill in the gaps.

One application of SFNs is for transmission of digitally encoded data such as digital television (DTV), the system and related standards for which have been established by the Advanced Television Systems Committee ("ATSC"). Under the ATSC's DTV standard (or A/53 standard), hereby incorporated herein by reference in its entirety, it is possible to transmit large amounts of data including high definition pictures, high quality sound, multiple standard definition pictures, and other ancillary related or unrelated communications, which may be accessible by using a computer or television set.

The DTV standard includes the following layers: the video/audio layer, compression layer, transport layer, and the transmission layer. At the top of the hierarchy is the uncompressed digital signal in one of the various digital data formats (e.g., video/audio formats). The data stream that corresponds with the video/audio layer is known as the elementary stream.

The compression layer compresses the elementary stream into a bitstream with a lower data rate. In the ATSC DTV standard, MPEG-2 compression is used for the video and the Dolby AC-3 compression is used for the audio. The compressed bitstream, in turn, may be packetized and multiplexed with other bitstreams into a higher data rate digital bitstream in the transport layer by an multiplexer. The MPEG-2 transport protocol defines (among several other things) how to packetize and multiplex packets into an MPEG-2 transport stream. The result is a stream of highly compressed data packets in a multiplexed bitstream which may include multiple programs and/or multiple data signals.

The multiplexed bitstream from the transport layer is modulated onto a radio frequency (RF) carrier in the transmission layer by a transmission system. The terrestrial broadcast mode utilized in the current ATSC DTV standard to transmit digital signals over the airwaves is called eight-level Trellis Coded vestigial sideband (8T-VSB).

FIG. 1 is a block diagram of a well known Trellis-coded 8T-VSB transmitter 100 used in an RF transmission system. The transmitter receives the incoming data packets of interspersed video, audio, and ancillary data, and, using a data randomizer 102, randomizes the data to produce a flat, noise-like spectrum. A Reed-Solomon (RS) encoder 104, known for its good burst noise correction capability and data overhead efficiency, RS-encodes the randomized data to add parity bytes to the end of each data packet. In turn, the data is convolutionally interleaved (i.e., spread out) over many data segments by a byte data interleaver 106.

A pre-coder and Trellis encoder 108 (referred to in the specification hereafter as a "Trellis coder") add additional redundancy to the signal in the form of multiple data levels, creating multilevel data symbols for transmission. A synchronization insertion component 110 multiplexes the segment and frame synchronizations with the multilevel data symbols before a DC offset is added by a pilot insertion component 112 for creation of the low-level, in-phase pilot. Segment and frame synchronizations are not interleaved. A VSB modulator 114 provides a filtered intermediate frequency (IF) signal at a standard frequency, with most of one sideband removed. Finally, an RF upconverter 16 translates the signal to the desired RF channel.

Multipath propagation is a common problem in single transmitter broadcast environments because it places a burden on a receiver equalizer's ability to handle signal echoes. In a distributed transmission system, where multiple transmitters are utilized, the multipath propagation problem is compounded. It is necessary, therefore, to synchronize or adjust the timing of the SFN system to control the delay spread seen by receivers in areas of SFN induced multipath not to exceed delay handling range of receiver equalizers and become problematic.

In addition, the output symbols of each transmitter is based on the transport stream received, how this is then mapped into a Data Frame and the initial states of the Trellis coders, which are normally random. When the transmitters emit the same symbols as one another for the same data inputs, they are said to be made "coherent". If the transmitters in an SFN are not synchronized, they will not emit coherent symbols.

The ATSC has promulgated a standard, referred to as the A/110 standard, which provides rules for synchronization of multiple transmitters emitting Trellis-coded 8T-VSB signals in an SFN or distributed transmission system (DTx) to create a condition which allows multiple transmitters being fed by the same transport stream to produce coherent symbols. SFN and DTx are to be understood to be synonymous terms. The A/110 standard is hereby incorporated herein by reference in its entirety.

Another standard promulgated by the ATSC, referred to as the A/111 standard, provides ATSC recommended practices for the design of synchronous multiple transmitter networks. The A/111 standard is also hereby incorporated herein by reference in its entirety.

FIG. 2 shows a block diagram of an ATSC SFN system 200 using A/110 distributed transmission (DTx). SFN system 200 includes three elements: an external time and frequency reference (shown as GPS), a distributed transmission adapter (DTxA) 202 situated at the source end of the distribution (or studio-to-transmitter link (STL)) subsystem, and plural RF transmission systems 208. DTxA 202 includes two basic blocks: a transmitter synchronization inserter 206 and a data processing model 204. Transmitter synchronization inserter 206 inserts information (described in more detail below) into the transport stream (TS). The data processing model 204 is a model of the data processing in an ATSC modulator which serves as a master reference to the slaved synchronized data processing blocks 210 in the RF transmission systems 208. Generally, each RF transmission system 208 includes two blocks: synchronized data processing block 210 and signal processing and power amplification block 211, which collectively are sometimes referred to as a "modulator" 212. These low level stages of the transmitter are also generally referred to as the "exciter" component. Herein the terms exciter and modulator are use interchangeably.

In an ATSC SFN system each synchronized data processing block 210 also includes a Trellis-coded 8-VSB transmitter 100 discussed above with reference to FIG. 1. As shown in FIG. 2, the DTxA produces a transport stream (TS) and feeds this stream to all of the synchronized data processing blocks 210.

FIG. 3 shows the structure 300 of a distributed transmission packet in accordance with the A/110 standard and FIG. 4a depicts a VSB data frame, which includes packets of data and forward error correction (FEC), and data field synchronization (DFS) fields.

The A/110 standard requires the following three ATSC system elements to be synchronized: 1. frequency synchronization of the pilot or carrier frequencies, 2. data frame synchronization, and 3. pre-coder and Trellis encoder (Trellis coder) synchronization. A description of how these three elements are synchronized in a group of separately located transmitters follows.

According to the A/110 standard, control of two specific transmitter frequencies is required. First the RF frequency of the transmitted signal, as measured by the frequency of its pilot, must be accurately controlled to maintain frequencies of the transmitters close enough to one another that the receiver is not over-burdened with apparent Doppler shift between the signals. The symbol clock frequency must be accurately controlled to allow the output symbol stream to maintain stable, relative, time offsets between transmitters in a network. A flag, stream_locked_flag, in the DTxP packet structure is used to identify one of two options for performing symbol frequency synchronization. This flag is a 1-bit field that indicates to a slave transmitter whether it is to lock its symbol clock frequency to the incoming transport stream clock frequency (normal ATSC methodology) or to lock its symbol clock frequency to the same external precision reference frequency used throughout the network (e.g., GPS).

Data frame synchronization requires all of the slave modulators 212 in an SFN to use the same transport stream (TS) packet to start a VSB data frame (FIG. 4a). In the current ATSC A/110 standard, this is accomplished by using DTXA 202 by inserting a cadence signal. In particular, a cadence signal (CS) is inserted at a deterministic point in time, once every 624 packets, into the MPEG-2 transport stream from the DTxA to each of the modulators 212. Dividing the rate of CS by half produces a Data Field Sync (DFS). The A/53 standard specifies that the data randomizer 102, RS encoder 104, and data interleaver 106 and intra-segment interleaver in part of 108 in the slave synchronized data processing blocks 210 shall all slave to DFS.

In addition, the A/110 standard provides that it is necessary to develop a state condition for the Trellis coder memories to be applied at a specific epoch in the data stream simultaneously by all RF transmission systems 208 in a network. According to the A/110 standard, "in order to put the pre-coders and trellis encoders of all the transmitters in a network in the same state at the same time, it is necessary to 'jam sync' them to the trellis coder model in the Distributed Transmission Adapter." In other words, Trellis coders cannot be synchronized by identifying an epoch in the transport stream (TS). Instead, to place the Trellis coders of all the transmitters in a network in the same states at the same time, a sample of all Trellis coder states in the data processing model 204 is captured, and this data is carried in an element of the DXP, Trellis_code_state (FIG. 3), from DTxA 202 to all the slave modulators 212.

At a later, deterministic point in time, the Trellis code states that have been extracted from the DXP are used to initialize the memory of each Trellis coder in the slave modulators 212, to the state of the data processing model 204 in DTxA 202. Once this has been performed, the modulator Trellis coders are synchronized and all the modulators 212 should produce "coherent symbols." In addition, the DTxA indicates operating mode to the transmitters and provides information to be transmitted in the data field sync data segment through a field rate side channel, which carries information updated regularly at a data field rate.

The ATSC A/110 standard further introduces an RF watermarking technique to support different types of measurements required in distributed transmission networks for setup and maintenance. RF watermarks can be carried by ATSC 8-VSB signals and used to identify transmitters and for measuring various characteristics of the signals when they are received. For example, RF watermarking permits each transmitter to simultaneously broadcast site-specific data, such as status and telemetry, to a distributed transmission network (DTxN) field monitoring or data collection point. Return channels provide a pathway to return data from one or more transmitters without requiring separate telemetry channels. Each distributed transmitter transmits an independent data signal on the broadcast channel using a Code Division Multiple Access (CDMA) technique. The return channel is a low data rate channel. However, there are no restrictions on the data it can carry.

FIG. 4b depicts a VSB data frame including CDMA channel RF watermarking injection in accordance with the ATSC A/111 standard. As shown in FIG. 4b, in addition to symbol synchronization, the RF watermark is also time-synchronized to the data frame of the 8-VSB host signal.

Generally, RF watermark signals appear to be random noise. The pseudorandom noise (PN) sequences used, however, are deterministic periodic sequences that can be detected by special-purpose receivers. The particular form of PN sequences used in the RF watermark are known as Kasami sequences, which are generated by combining the outputs of several linear feedback shift registers. The resulting RF watermark symbols are added to the host 8-VSB symbols before they are passed to the digital-to-analog conversion process of the 8-VSB modulator. This produces a low-level binary RF watermark signal riding on and synchronized with the 8-VSB host signal. A more detailed description of the aforementioned RF watermarking technique can be found in the A/111 standard, which as stated above is incorporated herein by reference.

The method used by A/110 standard to achieve Trellis coder synchronization adds much complexity to the overall SFN distributed transmission system design by requiring the DTxA 202 to sample the data processing model's Trellis coder states. Moreover, the A/110 does not provide the ability to post process data in the modulator once it exits the DTxA. A change of one bit in data stream after DTxA will break the Trellis code synchronization scheme thus making it difficult, if not impossible, to add enhancements to ATSC standard A/53. Moreover, as more transmitters are added in a multi-tier (e.g., distributed-translator) scheme the complexity of an SFN under the A/110 standard grows since an additional data processing model 204 must be added for each tier. Thus, what is needed is a technology that is scalable in SFN applications without adding additional complexity or constraints on system extensibility of the overall system.

In addition, in response to broadcasters' calls for flexible use of digital TV spectrum, the ATSC has requested the industry to explore "enhancements" to the VSB scheme that lies at the core of its DTV standard. Such enhancements include enhanced reception on fixed/indoor devices, handheld (i.e., portable) and mobile devices, and broadcasting of both video and data to mobile communicators and other handheld equipment, and the like. Heretofore, there has not been proposed in response to the ATSC request a solution which advantageously utilizes the deterministic nature of the ATSC system. Nor has the CDMA spread spectrum technique used in the current ATSC specifications been utilized to provide signaling information to receiving devices, such handheld/portable, mobile, fixed/indoor, to notify such devices of service availability in advance of service transmission. Nor have third party communication links been utilized to provide signaling information. Accordingly, another need exists to provide enhancements to both single transmitter networks as well as SFN which leverage the deterministic frame structure incorporated in these broadcast systems.

Signal coverage is always a concern to broadcasters. As described above, many mobile users reside in areas that are substantially terrain shielded from primary transmitter locations. While placing additional transmitters or boosters may help in many situations, it may not always be a viable solution to do so, such as under overpasses or in relatively short tunnels. When a mobile receiver moves through such a terrain shielded reception environment, signals fade or drop out temporarily.

Consumers demand high quality reception without substantial signal loss. The auto industry, for example, requires system availability of greater than 99.5%. This means that signal reception, must be near perfect, even under adverse conditions. There is a need therefore to mitigate the effect of such the aforementioned signal fades and dropouts.

Given the foregoing, what is needed is a system, method and computer program product for apparatus, systems and methods for providing time diversity for mobile broadcast services.

BRIEF DESCRIPTION OF THE INVENTION

The present invention meets the above-identified needs by providing apparatus, systems, and methods for providing enhancements to ATSC networks using synchronous vestigial sideband (VSB) frame slicing.

An advantage of the present invention is that it is backward compatible with existing ATSC standards and legacy ATSC receivers.

Another advantage of the present invention is that it provides enhanced service content using bandwidth that would have been otherwise wasted.

Yet another advantage of the present invention is that it takes advantage of the deterministic nature of a synchronous transmission system.

In one aspect of the present invention, systems, methods, and apparatus are provided for providing to a receiver a time diverse digital signal corresponding to a service including receiving a digital signal containing a service content and receiving a digital signal containing a non-deterministic content. The service content is inserted into a first predetermined number of data packets in a first predetermined number of data frames deterministically. In addition, a first portion of the non-deterministic content is inserted into a second predetermined number of data packets in the first predetermined number of data frames. A copy of the first predetermined number of data packets is generated. The first predetermined number of data frames is broadcast over a distribution network. The copy of the first predetermined number of data packets is inserted into a second predetermined number of data frames and a second portion of the non-deterministic content is inserted into the second predetermined number of data frames. The second predetermined number of data frames are broadcast after a predetermined time.

In another aspect of the present invention, systems, methods and apparatus are provided for receiving a time diverse digital signal corresponding to a service. A first digital signal containing a first predetermined number of data frames including a first predetermined number of data packets is received and demodulated. The first predetermined number of data frames are demultiplexed and the first predetermined number of data packets of the first set of the predetermined number of data frames are buffered. A second digital signal containing a second predetermined number of data frames including a copy of the first predetermined number of data packets is received and demodulated and the second predetermined number of data frames are demultiplexed. The first predetermined number of packets and the copy of the first predetermined number of packets are compared and a predetermined number of packets are supplied to a service content application decoder based on the comparison.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 3 shows the structure of distributed transmission packet in accordance with the A/110 standard.

FIG. 5 is a system diagram of an exemplary SFN in accordance with an embodiment of the present invention.

DETAILED DESCRIPTION

Figure 1:
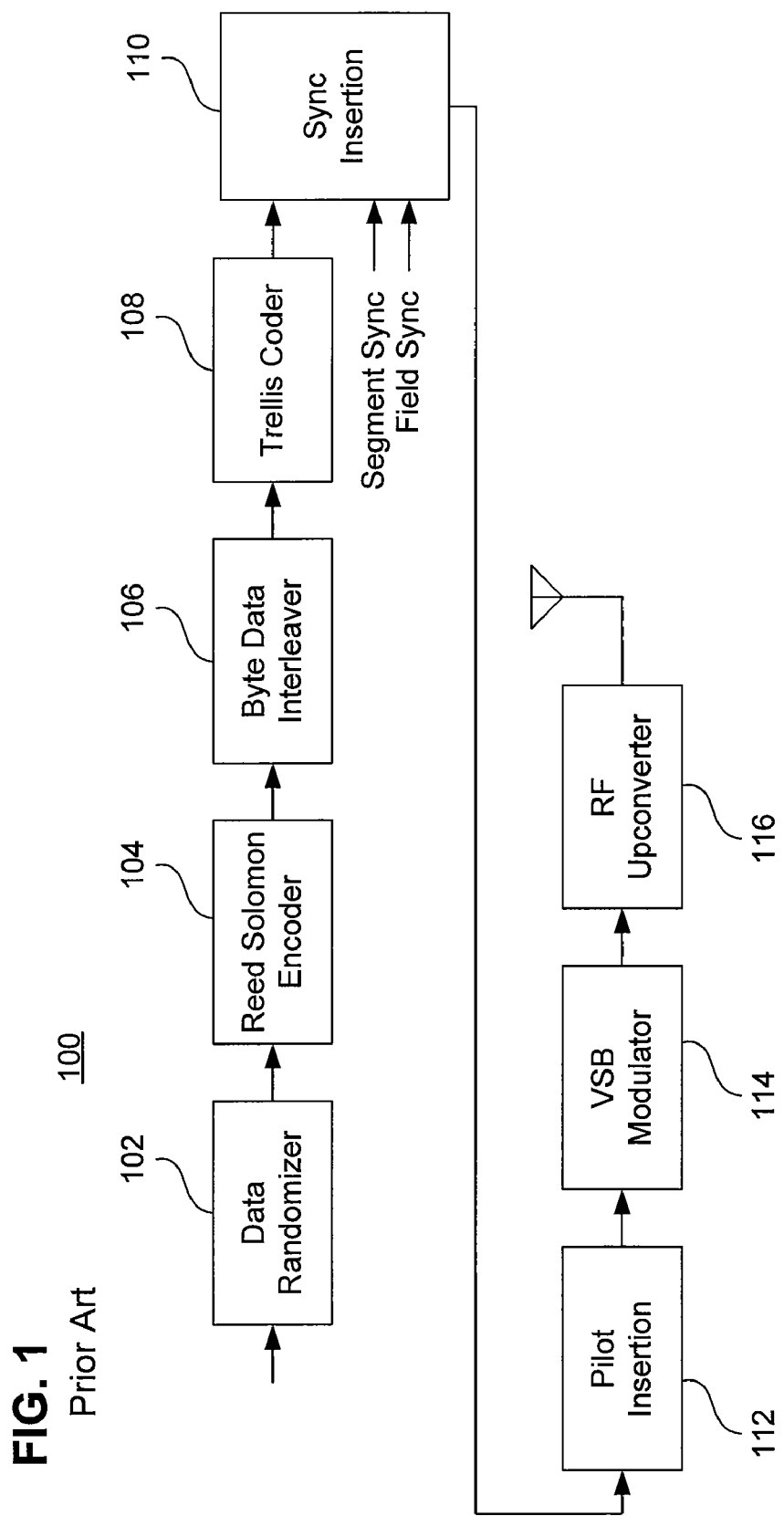
FIG. 1 is a block diagram of a Trellis-coded 8-VSB transmitter 100.
Figure 2:
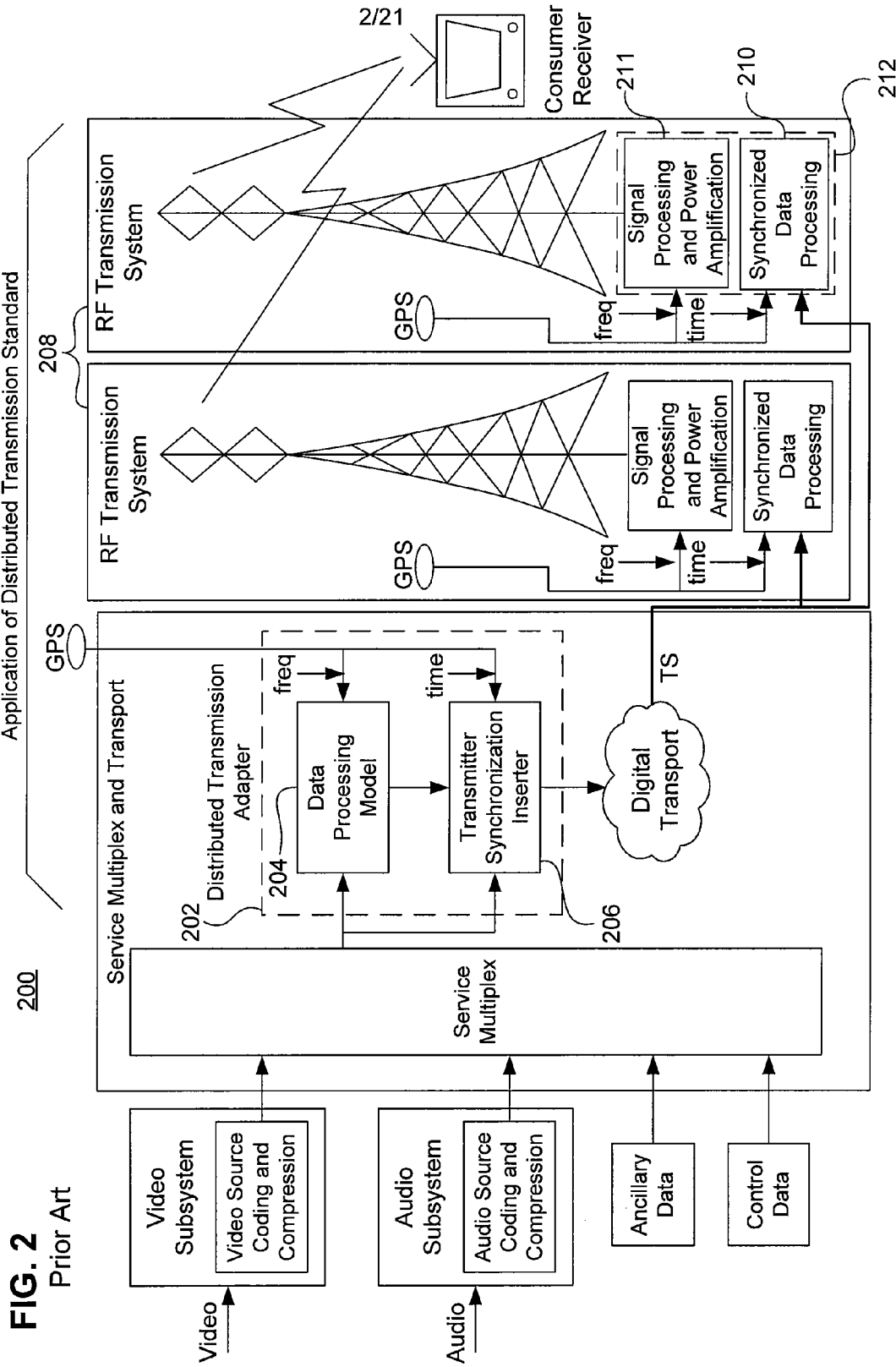
FIG. 2 shows a block diagram of an ATSC SFN system using A/110 distributed transmission where multiple Trellis coded 8T-VSB transmitters are fed by the same transport stream.
Figure 4A:
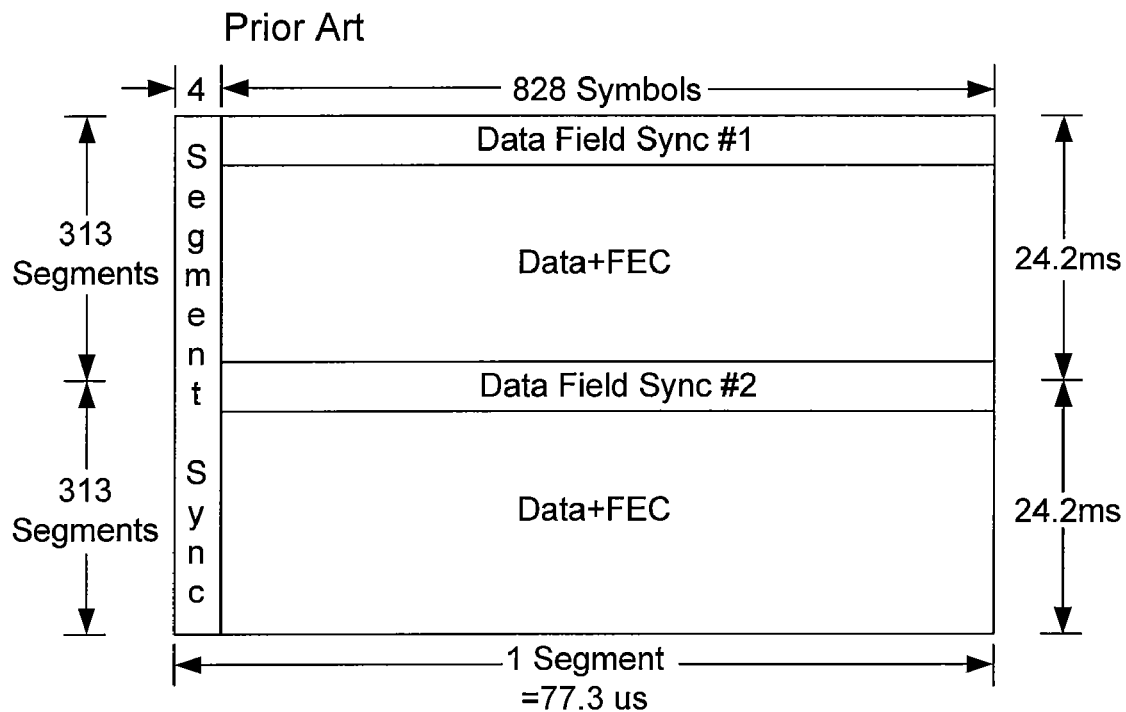
FIG. 4a depicts a VSB data frame in accordance with the ATSC A/53 standard.
Figure 4B:
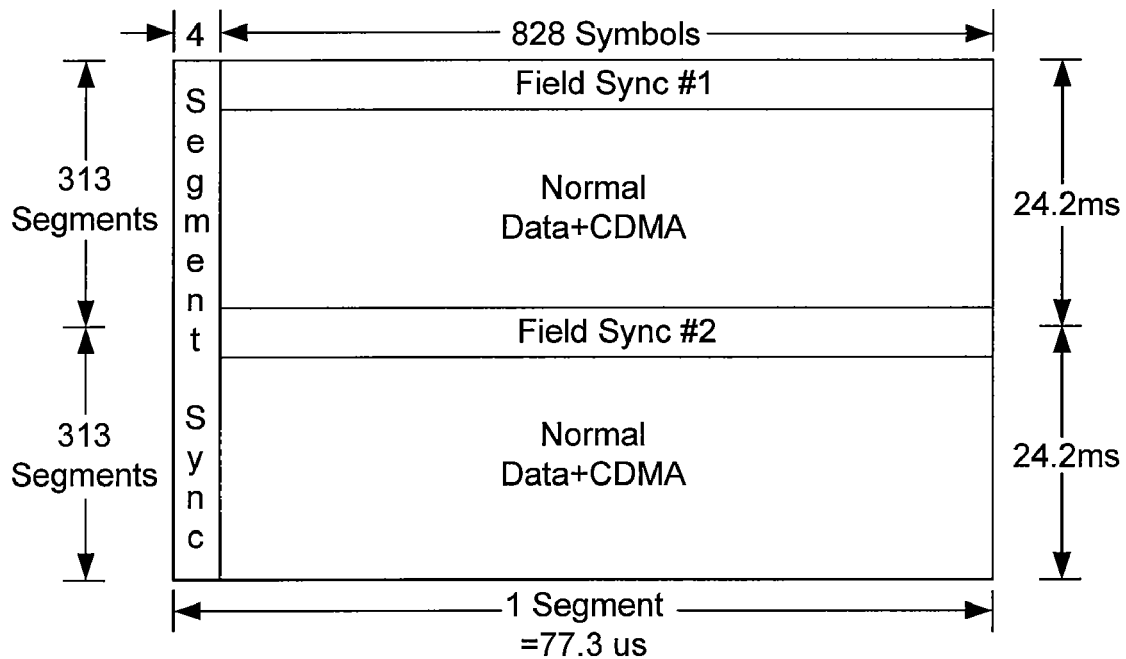
FIG. 4b depicts a VSB data frame including CDMA channel injection in accordance with the ATSC A/111 standard.

The present invention is now described in more detail herein in terms of an exemplary system, method and apparatus for providing enhancements to ATSC networks using synchronous vestigial sideband (VSB) frame slicing in single transmitter networks and SFN, and for providing time diversity for mobile broadcasters. This is for convenience only and is not intended to limit the application of the present invention. In fact, after reading the following description, it will be apparent to one skilled in the relevant art(s) how to implement the following invention in alternative embodiments (e.g., multi-frequency networks).

Generally, the present invention performs the required ATSC synchronizations: 1. frequency synchronization of the pilot or carrier frequencies, 2. data frame synchronization, and 3. pre-coder/trellis coder synchronization.

Once data frame synchronization has been performed, the deterministic nature of how data packets will fall within a data frame is used to provide enhanced capabilities. More particularly, a multiplexer at the source end of the distribution (or studio-to-transmitter link (STL)) is utilized to group and/or preprocess packets that have been deterministically selected in accordance with a deterministic mapping. The groups (referred to hereafter as "slices") are then emitted by the multiplexer through a transport stream over a distribution network. As will be discussed below in more detail, the packets may be encoded and interspersed throughout a transport stream.

Service availability information is signaled by the multiplexer to a receiving device through an exciter. In one embodiment, a reserved area in the data field sync is utilized to communicate the signaling information to communicate available services and corresponding deterministic mappings.

The exciter sync insertion unit 110 is used to generate data frames having 624 segments. The present invention, deterministically maps the service content into slices defined as a predetermined number of segments of data (e.g., 52 segments). This number is derived by dividing a 624 segment VSB frame by a predetermined number of slices (e.g., 12).

Each slice contains service content corresponding to a particular service, such as to provide known sequences of data segments for training purposes, to provide data directed segments, encoding, and the like. A slice may also be used without enhancements and carry normal content instead.

Complementary devices receive the signaling information that identifies available services. If the service is provided more robust signaling, the complementary devices are configured to decode the data. In addition, these devices can perform other operations on the service content such as using it to improve power management services. Fixed services, such as digital television (Digital HDTV) can also be provided with enhanced services received from rooftop or indoor antennas.

Once a complementary receiver is frame synchronized it is configured with a priori knowledge of when the enhanced data packets will arrive within a data frame. With this information, the receivers can detect, decode and use the service content to control the enhanced features or provide additional content. As will be described in more detail below, mapping can be static or dynamic. A static based implementation supplies the service content to a receiver on a predetermined periodicity (or multiple thereof), whereas a dynamically based implementation supplies the service content for different services by signaling to the receiving device that the information is deterministically changing.

Figure 7:
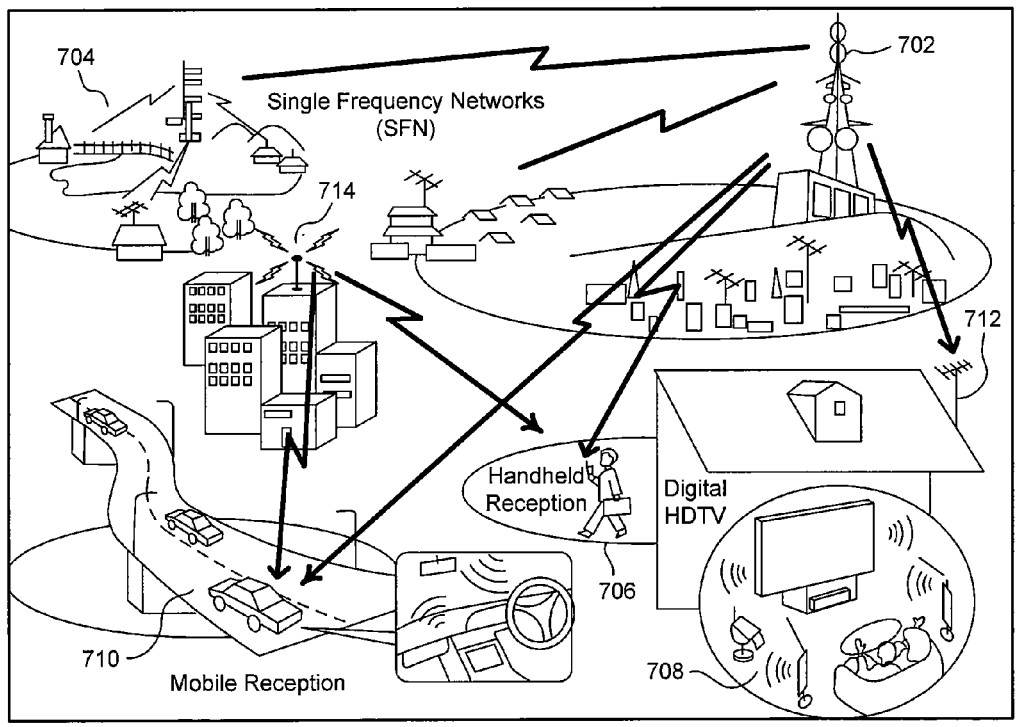
FIG. 7 depicts several possible service modes including mobile, indoor, handheld, and fixed services receiving data from a single frequency network providing enhancements in accordance with the present invention.

FIG. 7 depicts several possible service modes including mobile 710, indoor 708, handheld 706, and fixed 712 services receiving data from a single frequency network 700 providing enhancements in accordance with the present invention. The present invention can be used across one or more of the exemplary services shown. The present invention also uses transmitter diversity to provide coherent signals from different locations, such as transmitter 702, single frequency network transmission system 704 and a smaller building transmitter 714.

Frequency synchronization of the pilot or carrier is achieved by locking the carrier frequency of an exciter in the RF transmitter system to a reference from a GPS timebase. Transmitter diversity allows transmitters at different locations to transmit coherent symbols.

The start of a data frame is determined (i.e., synchronized) by identifying a point in the transport stream via a special timing packet. Generally, a transport stream (TS) having a specialized timing packet is generated at a broadcast installation. The TS rate is locked to a GPS clock (e.g., 10 MHz), and the GPS temporal reference (e.g., 1PPS) is used to construct the timing packet. The synchronization packets identify a cadence "epoch" point in the TS, which is used to slave all the data frames to be broadcast from one or more RF transmission systems, and hence provide data frame synchronization (DFS).

The present invention further provides a deterministic initialization of the Trellis coder memories by creating packets with predetermined data patterns located at deterministic positions throughout a data frame. The predetermined data patterns are transmitted from the broadcast station to an exciter to cause its Trellis coder states to be initialized in a fixed predictable fashion. Data frame synchronization and Trellis coder synchronization can thus occur using a single initialization packet.

FIG. 5 is a system diagram of an SFN 500 in accordance with an embodiment of the present invention. A transport stream emitter 514 in a broadcast installation such as a studio or network operations center ("NOC") is fed a data stream (e.g. MPEG-2 data stream). Transport stream emitter 514 transmits the data stream to a distribution network 506 in the form of a transport stream (TS) having VSB frame initialization packets (VFIPs). VFIPs are specialized synchronization packets generated by an emission multiplexer 504 of the transport stream emitter 514. In one embodiment, a VFIP module within an emission multiplexer 504 generates VFIPs. The TS with a VFIP is transmitted to one or more transmission systems 502 through a distribution network 506 (e.g., fiber, satellite, microwave and the like). Emission multiplexer 504 is clocked by a GPS timebase 505.

RF transmission systems 502 down stream from the broadcast installation include an exciter 512 which can detect the VFIPs in the transport stream. In addition, RF transmission systems 502 include other components such as power amplifiers (PAs) 513. As noted above exciters are also sometimes referred to as modulators.

In one embodiment of the present invention, emission multiplexer 504 as well as all the other nodes in SFN 500 are clocked by a common timebase, GPS timebase 505. Frequency synchronization of the pilot or carrier is thus achieved by locking the carrier frequency of exciter 512 to the 10 MHz reference from the GPS timebase 505 to regulate the apparent Doppler shift seen by ATSC receiver from the SFN in overlapping coverage areas.

As explained above, data frame synchronization requires that all exciters in an SFN choose the same packet from the incoming TS to begin a VSB data frame. In the present invention, each exciter 512 follows the frame synchronization timing of emission multiplexer 504 to achieve initial frame synchronization and to maintain this condition.

Emission multiplexer 504, has its data rate locked to the GPS reference 505, and initiates frame synchronization by selecting one of the TS packets to begin a VSB Frame. Once an initial TS packet has been selected to start the count, emission multiplexer 504 counts 623 TS packets inclusive of the selected packet (e.g., 0-622) emission multiplexer 504 inserts a VFIP as the last (623) packet. This corresponds to a container of data (624 packets) which is equivalent to the payload in an ATSC A/53 VSB frame having 624 payload segments.

Figure 6:
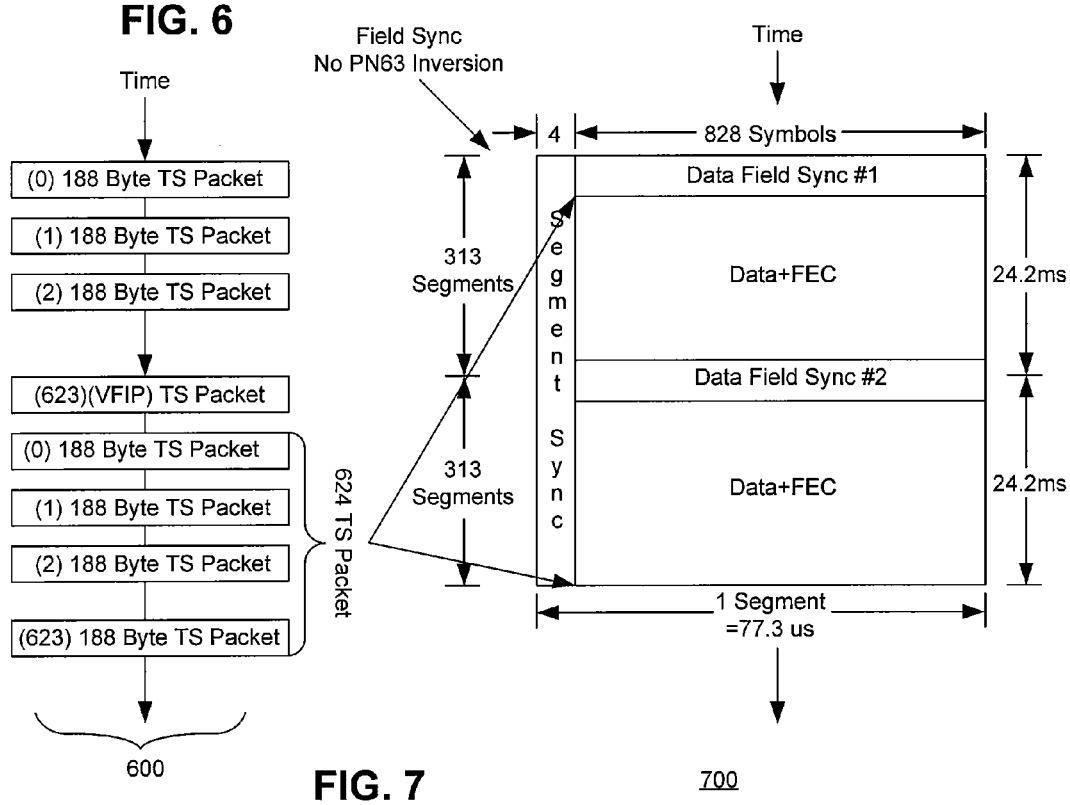
FIG. 6 illustrates a method for inserting VSB frame initialization packets (VFIPs) in accordance with an embodiment of the present invention.

Emission multiplexer 504 inserts a VSB frame initialization packet (VFIP), as shown in FIG. 6. By the placement of VFIP in the last packet slot (623) signaling of a VSB frame is made implicit. Upon reception of the VFIP, each exciter 512 is signaled to the start a new data frame after the last bit of VFIP packet is received. The cadence also referred to as timing or frame rate of the VSB frames is thus based on the frame synchronization timing which is maintained by emission multiplexer 504. Since emission multiplexer 504 is locked to GPS timebase 505, the 0-623 packet count becomes the cadence of the VSB frame rate. After the first VFIP insertion, additional VFIPs or slices of packets containing service content can be inserted subsequently thereafter at a predetermined periodicity (e.g., approximately once per second). For example, whenever emission multiplexer 504 inserts a VFIP, it will appear in the 623 slot as determined by a cadence counter in emission multiplexer. Slices can also be inserted on a dynamic basis since signaling provides receiving devices with a deterministic mapping as to when the service content will be broadcast.

Figure 8:
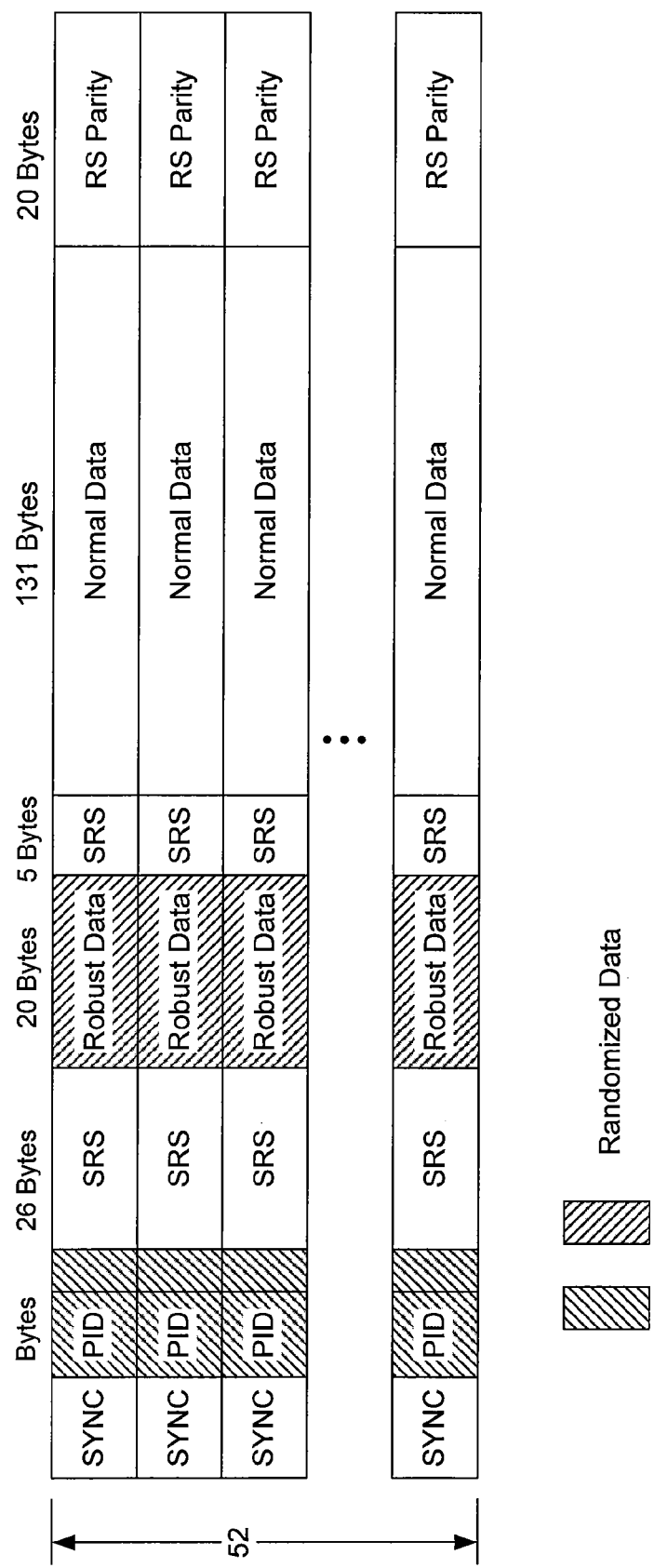
FIG. 8 depicts the structure of a slice of 52 packets created from the received packets and before entering the interleaver stage of a modulator in accordance with one embodiment of the present invention.

FIG. 8 depicts the structure of a slice of 52 packets created from the received packets before entering the interleaver stage 106 of exciter 512 in accordance with one embodiment of the present invention. As described above, the position of bytes in the packets are based on the a priori knowledge of the interleaver. It should be understood that FIG. 8 is conceptual and shows an arrangement of fields within each packet in accordance with one exemplary interleaver mapping. The packet arrangements (i.e., field positions) will be different depending on the interleaver mappings. Accordingly, the placement of fields of the segments in different locations in accordance with other interleaver mappings is within the scope of this invention.

As shown in FIG. 8, each packet includes a packet identifier (PID) field stored in the header portion of the packet and a SYNC field. The SYNC (e.g., an MPEG sync) allows for synchronization of transport stream packets. Exciter 512 replaces the SYNC with a segment sync. The packet carries additional information such as training information (SRS), as well as service specific content. In the example shown in FIG. 8, the service specific content is outer layer encoding (Robust Data). Normal content also is carried in the packets in the Normal Data field.

Exciter 512 identifies each packet by its PID. In an exemplary embodiment, exciter 512 identifies a packet as a VFIP when its PID value is 0x1FFA. After the VFIP packet has been read, exciter 512 inserts a VSB data field sync. Referring to FIG. 6, the frame payload segments thus begins after Data Field Sync #1. Exciter 512 in turn makes a determination whether 312 TS packets have been received. If so, exciter 512 inserts additional DFSs per the A/53 standard.

As described in the ATSC A/53 standard, a DFS includes a series of pseudorandom number (PN) sequences of length 511, 63, 63, and 63 symbols, respectively. The PN63 sequences are identical, except that the middle sequence is of opposite sign in every other field sync. This inversion allows the receiver to recognize the alternate data fields comprising a frame. In Data Field Sync #1 all three PN63 sequences are in the same phase and in Data Field Sync #2 the middle PN63 sequence is inverted and the other two have the same phase. The exciter 512 inserts a DFS with no PN63 inversion directly after the last bit of the VFIP packet and then continues with normal VSB frame construction starting with next TS packet (0) as first data-segment of the next VSB frame.

If an exciter 512 has already been frame synchronized, a received VFIP packet can be used to verify the exciter is still in phase with frame cadence maintained in the emission multiplier because of the implicit placement of VFIP in transport stream. Similarly, sync inserter 110 inserts the data field syncs to generate data frames containing slices of service content.

As explained above, it is also necessary to develop a state condition for the Trellis coder memories to be applied at a specific epoch in the data stream simultaneously by all transmitters in a network. The present invention uses a deterministic Trellis reset (DTR) to perform Trellis coder synchronization by forcing the Trellis coder to go into a known (e.g., zero) state as the VFIP packet enters the Trellis coder.

Trellis coder synchronization is accomplished based on a priori knowledge of the location of the interleaved VFIP packet at the output of byte data interleaver 106 (FIG. 1) before the Trellis coder stage 108 (FIG. 1). With the knowledge of the output of the ATSC interleaver 106 once the data frame synchronization data has been achieved, twelve predetermined byte positions in VFIP are identified and used to trigger a DTR in each of the twelve Trellis coders in all of the exciters in the SFN. The initialization occurs as soon as each of these deterministically assigned bytes first enter its designated Trellis coder. More particularly, all Trellis coders are synchronized after the first four (4) segments of the VSB Data Frame without any need for any syntax in VFIP itself. Additional syntax can be added to control the emission timing and other auxiliary transmitter functions. Thus, by using emission multiplexer 504 to insert a VFIP, VSB frame synchronization is implicitly signaled. By the time the fourth data segment of a new VSB frame is transmitted, all Trellis coders in all exciters will be deterministically reset to a common zero state. Coherent symbols will be produced by all transmitters in SFN. Enhanced services in accordance with the present invention will now be described in more detail.

Figure 9:
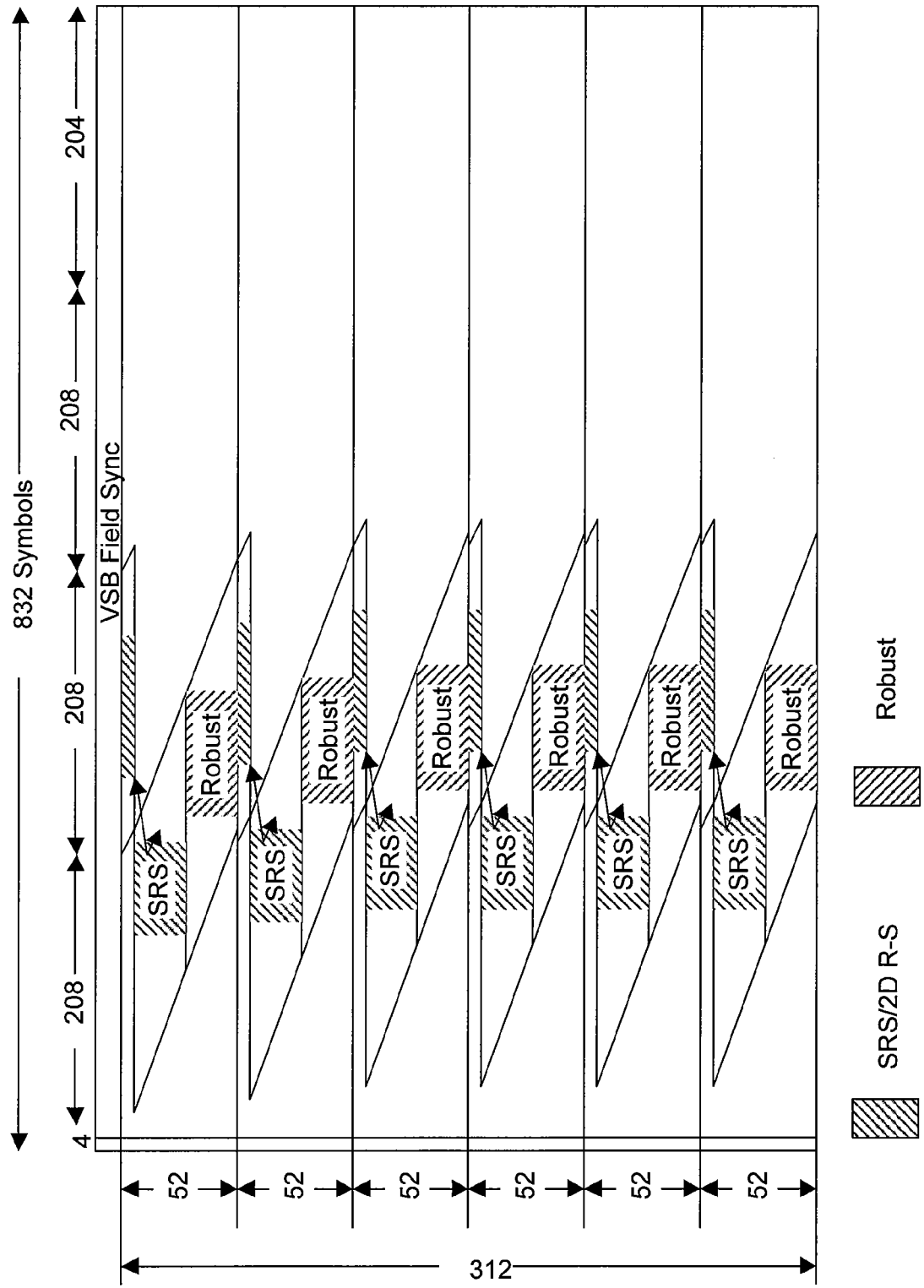
FIG. 9 depicts transmission of several slices of segments using static mapping in accordance with an embodiment of the present invention.

FIG. 9 depicts transmission of several slices of segments generated by exciter 512 using static mapping in accordance with an embodiment of the present invention. In particular, one data frame (i.e., 312 data segments) is divided into 52 segment slices carrying training information (SRS) and robust data. The training data can be used, for instance, to synchronize Trellis coders as described above, and the robust data can be used, for instance, to provide an additional layer of coding to provide better reception in handheld devices, power conservation services, and the like. As shown, every training field and robust data field is repeated on a static basis. It should be understood that to simplify the discussion of the static mapping shown in FIG. 9, dispersions of the segments caused by an interleaver in exciter 512 are not shown. A conceptual mapping of such dispersions caused by the interleaver 106 in exciter 512 is discussed below in more detail with reference to FIG. 17.

Figure 10:
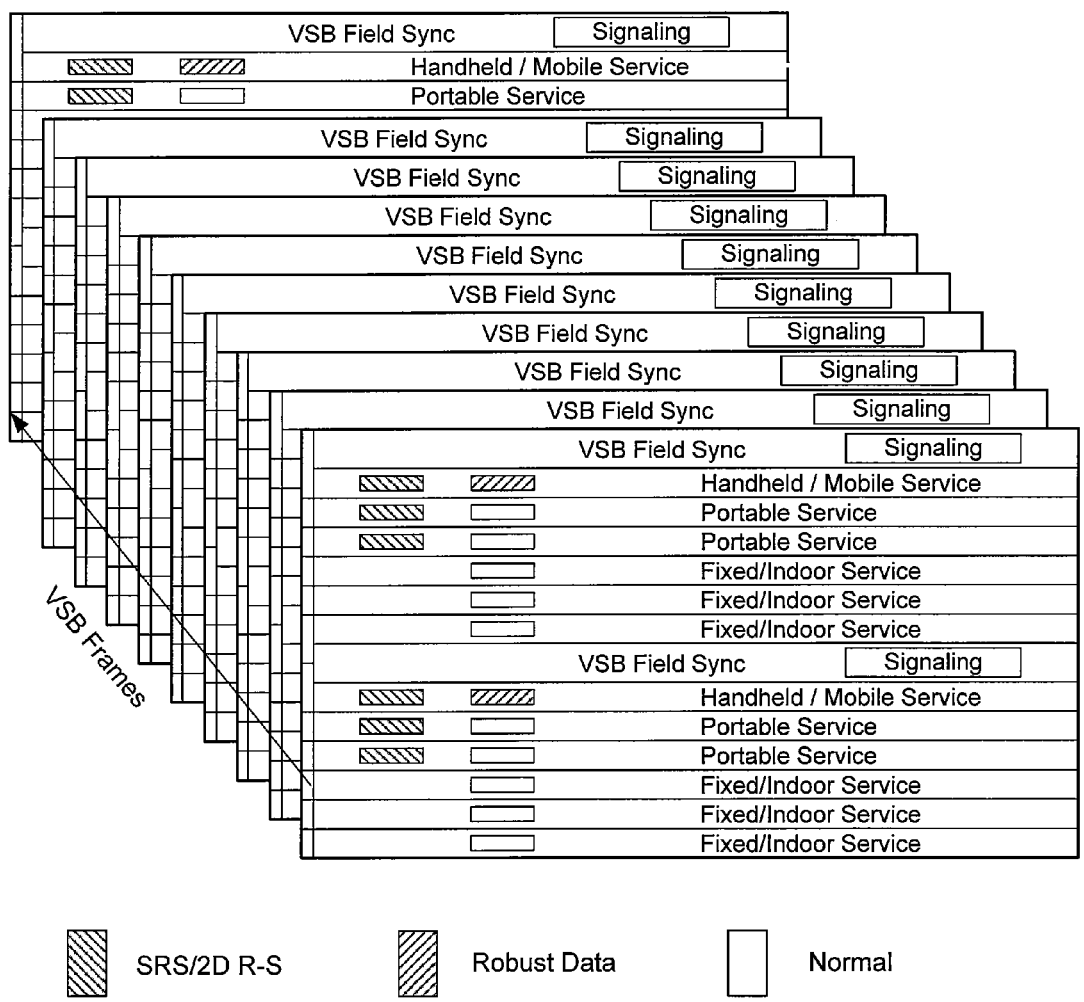
FIG. 10 depicts transmission of several slices of segments dynamically assigned across a VSB frame, in accordance with an embodiment of the present invention.

FIG. 10 depicts transmission of several slices of segments dynamically assigned across a VSB frame, in accordance with an embodiment of the present invention. Each frame carries data placed in locations known to correspond to different services (e.g., handheld/portable, mobile, fixed/indoor, and the like).

Emission multiplexer 504 provides the signaling information to each exciter 512 to provide announcements of services and their corresponding mappings. Exciter 512 extracts and buffers this information. Once buffered, sync insertion unit 110 in exciter 512 reinserts this information into a reserved field in the data field sync area (shown as the "Signaling" block in FIG. 10). In ATSC, this reserved field is a 104 byte reserved area. Advantageously, this process uses place-holder bytes in the SRS field to carry signaling information between emission multiplexer 504 and exciter 512. The place-holder bytes are discarded by exciter and precalculated bytes are inserted in their place to create training signals. This place holder data space can thus be reused as a relatively high data rate (e.g., 1 MBit/sec) signaling channel, providing receivers with the option of discovering and consuming enhanced services. Heritage receivers will ignore this data and continue normally, and as such the present invention is backwards compatible.

A particular receiving device uses the signaling information to learn what information it will be receiving and at what time. In particular, the signaling information includes information identifying the availability of services as well as a deterministic mapping of the service content. The information can be used to deterministically map service content for different types of services, as well as for providing training information or Trellis coder synchronization information.

Legacy receivers will still be able to receive normal data. Through the signaling information provided, devices will be able to discover the service that is present and its mapping across a number of frames. Once a receiver device has the mapping, it will then have the ability to obtain and use training signal data, robust data, and other enhancement data. As shown in FIG. 10, more than one frame can be setup and signaled, allowing services to be mapped across the series of frames. Signaling can also be used to communicate to the receiving devices that enhancements will be suspended for a predetermined time, thus notifying to the receivers that only normal data will follow during that time.

Figure 11:
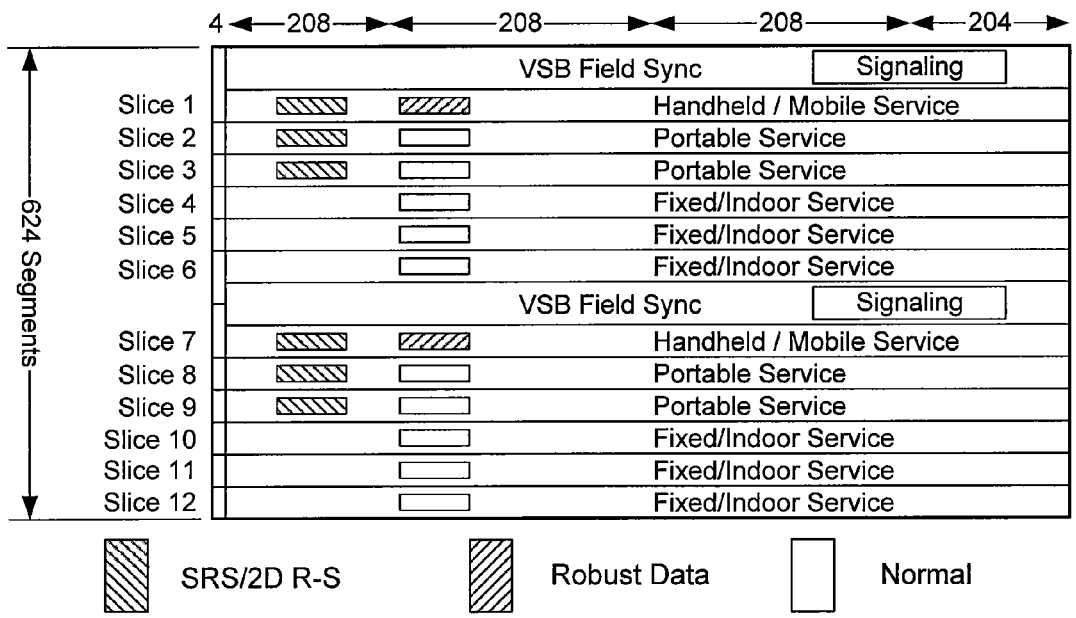
FIG. 11 depicts an exemplary synchronous VSB frame, implemented for various services using static mapping, in accordance with the present invention.

FIG. 11 depicts an exemplary synchronous VSB frame, implemented for various services using static mapping, in accordance with the present invention. Several services, including handheld/mobile, portable and fixed/indoor services are provided with enhanced feature capabilities by receiving packets of data at known points in time. In this example, each of the 12 slices within a data frame is assigned to a corresponding service. A packet can carry training information (SRS), additional coding (Robust Data), or simply normal data. A receiver extracts and demodulates the data in a slice corresponding to its service and performs an appropriate response.

Figure 12:
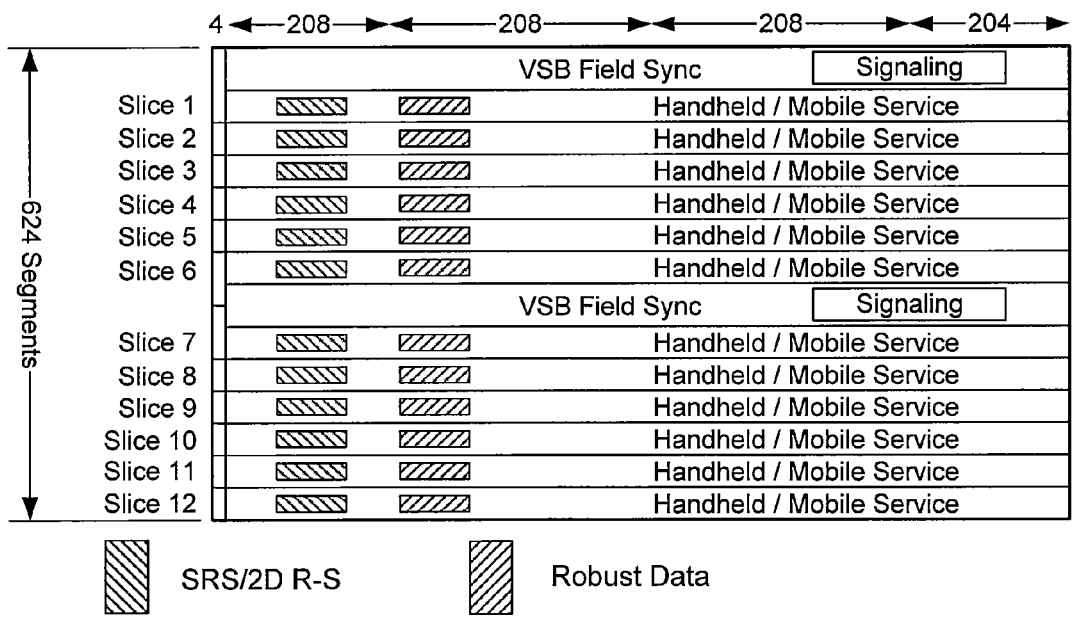
FIG. 12 depicts an exemplary burst of slices, in accordance with an embodiment of the present invention.

FIG. 12 depicts an exemplary burst of slices, in accordance with the present invention. Multiplexer 504 receives a digital signal and buffers a block of the received packets corresponding to the service content. In turn, multiplexer 504 transmits the block of packets at predetermined points in time. The multiplexer 504 also performs flow control of the bursts to control the timing of the bursts such that the buffers of the receiver are not overflowed or underflowed, maintaining buffer fullness.

Transmitting a block of packets as bursts of data allows a battery powered receiver (e.g., handheld device) to power up and buffer the block of data at deterministic points in time and to power down unneeded power consuming circuits between the bursts. Circuits can thus be powered up in anticipation of the next burst. The battery-powered receiver performs operations on the data in the buffer when powered. In this embodiment, slices are burst at a multiple of a predetermined number of seconds (e.g., 1 second). In addition, each slice of data can be burst contiguously, without gaps between the service content. Alternatively, the slices can be transmitted substantially contiguously with gaps between groups of service content. Thus additional "normal content" can be transmitted between the bursts (e.g., MPEG encoded data).

Signaling information in the signaling field can be used to instruct a receiving device when the next slice should be expected, allowing the service content (e.g., burst of packets) to be transmitted or received either at a predetermined periodicity or on an dynamic basis.

Figure 13:
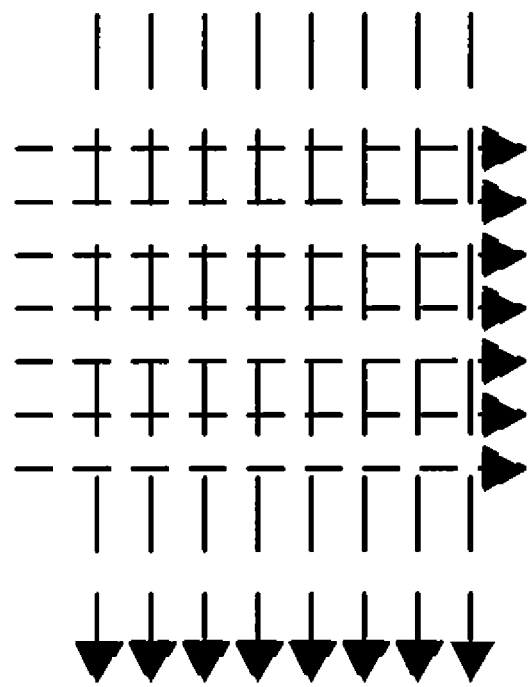
FIG. 13 depicts two-dimensional (2D) Reed Solomon (RS) coding in accordance with one embodiment of the present invention.

FIG. 13 generally depicts two-dimensional (2D) Reed Solomon (RS) coding in accordance with one embodiment of the present invention. As shown, outer forward error correction (FEC) coding, such as for example 2D RS coding, is performed to provide a more robust signal. Since the additional coding has its own parity and is coded in the transverse direction, data transmitted with such additionally coding has a better chance burst error recovery. In the exemplary embodiment depicted in FIG. 13, the outer coding is performed by the emission multiplexer 504 in the transverse direction of the normal ATSC lateral RS coding, which is performed on the data in the exciter 512. The present invention thus provides coding gain and additional time diversity, thereby increasing robustness. The inverse processes performed in both multiplexer 504 and exciter 512 are performed on the receiving devices.

It is not necessary to encode all the data with the additional coding algorithm. This provides for efficient use of network bandwidth as well as allows more enhancements to be provided to a wider scale of devices. This further allows the quality of service (QoS) to be controlled on a per service basis. In addition, the present invention dramatically improves the normal lateral RS threshold of visibility (TOV) and provides improved time diversity. Using enhanced outer coding also improves impulse noise and intra-frame dropout correction and can be used to compensate for known impulse noise on low VHF DTV.

Figure 14:
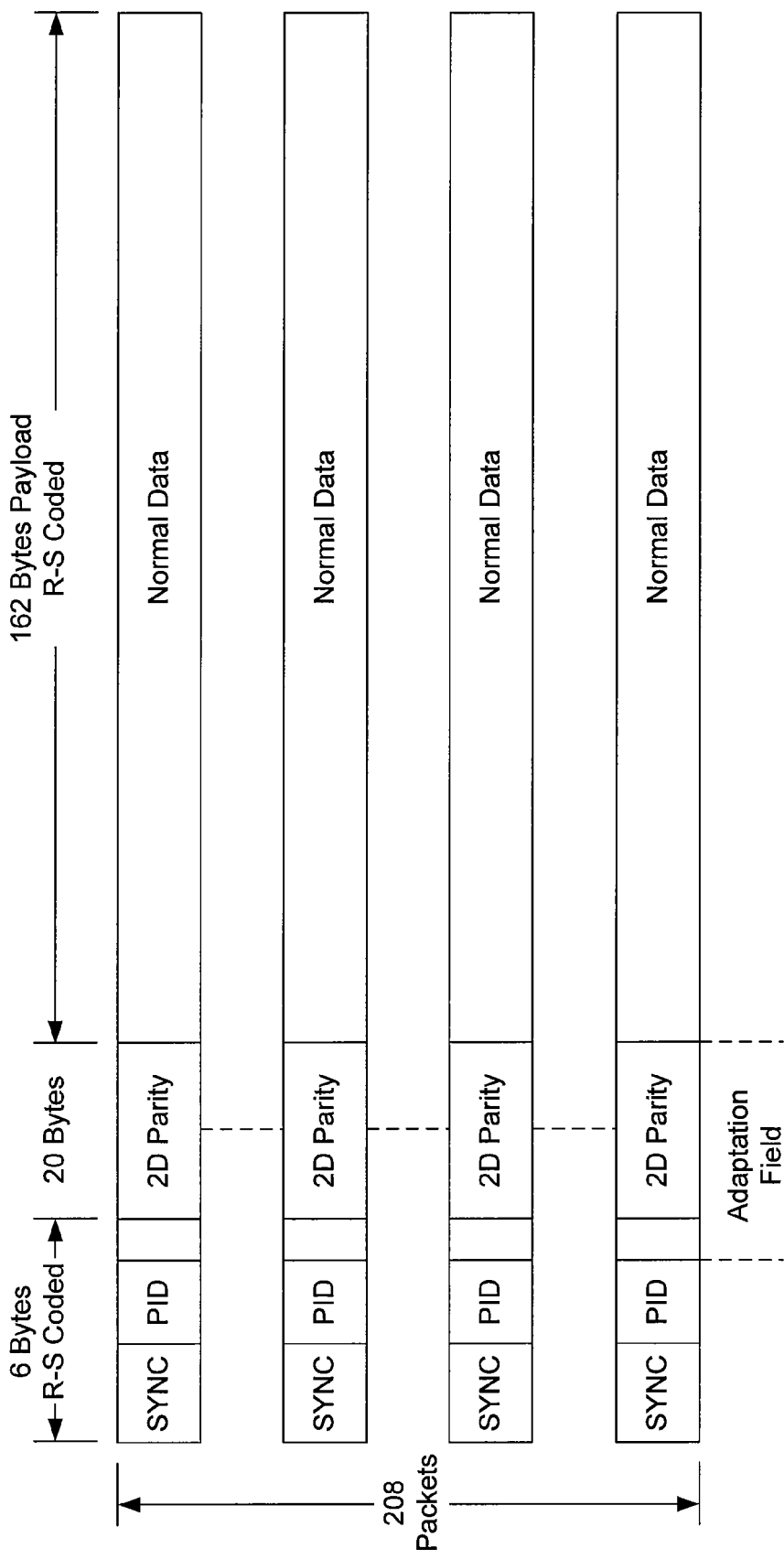
FIG. 14 illustrates the structure of packets in accordance with the present invention on which additional forward error correction (FEC) coding has been performed.

FIG. 14 illustrates the structure of packets in accordance with the present invention on which additional forward error correction (FEC) coding has been performed in multiplexer 504. As shown, normal data has been RS coded within a 162 byte payload field and 6 bytes of the packet are used to store the packet header as well as a portion of a predefined adaptation field. The parity data corresponding to the additional outer correction coding also is placed in an area in the adaptation field for private use. The example in FIG. 14 shows the private data containing the parity data for the additional outer FEC coding. Normal decoders will ignore the private data (e.g., 2D Parity data). A complementary receiver, however, would perform the inverse process on the private data to decode it.

Figure 15:
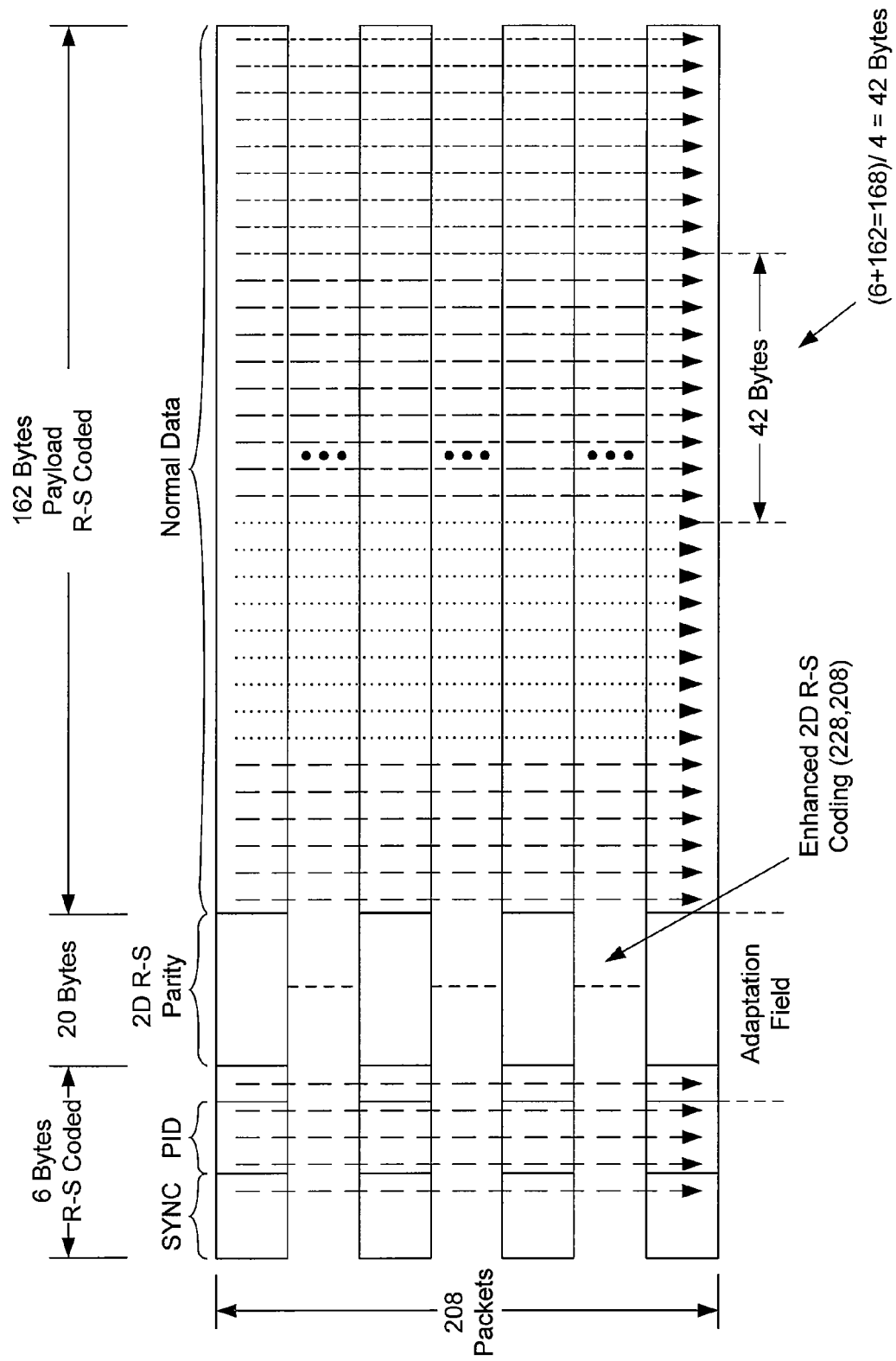
FIG. 15 illustrates the structure of packets in accordance with the present invention on which additional forward error correction (FEC) coding has been performed.

FIG. 15 expands on FIG. 14 to illustrate the structure of packets in accordance with the present invention on which additional forward error correction (FEC) coding has been performed. This example is similar to FIG. 14, except that the additional outer correction coding is performed over four packets. The first 42 bytes across the packet are transverse coded. As the arrows show, parity data corresponding to the transverse coded data is placed in the 2D RS Parity fields in the adaptation field of the 52 blocks of packets.

Figure 17:
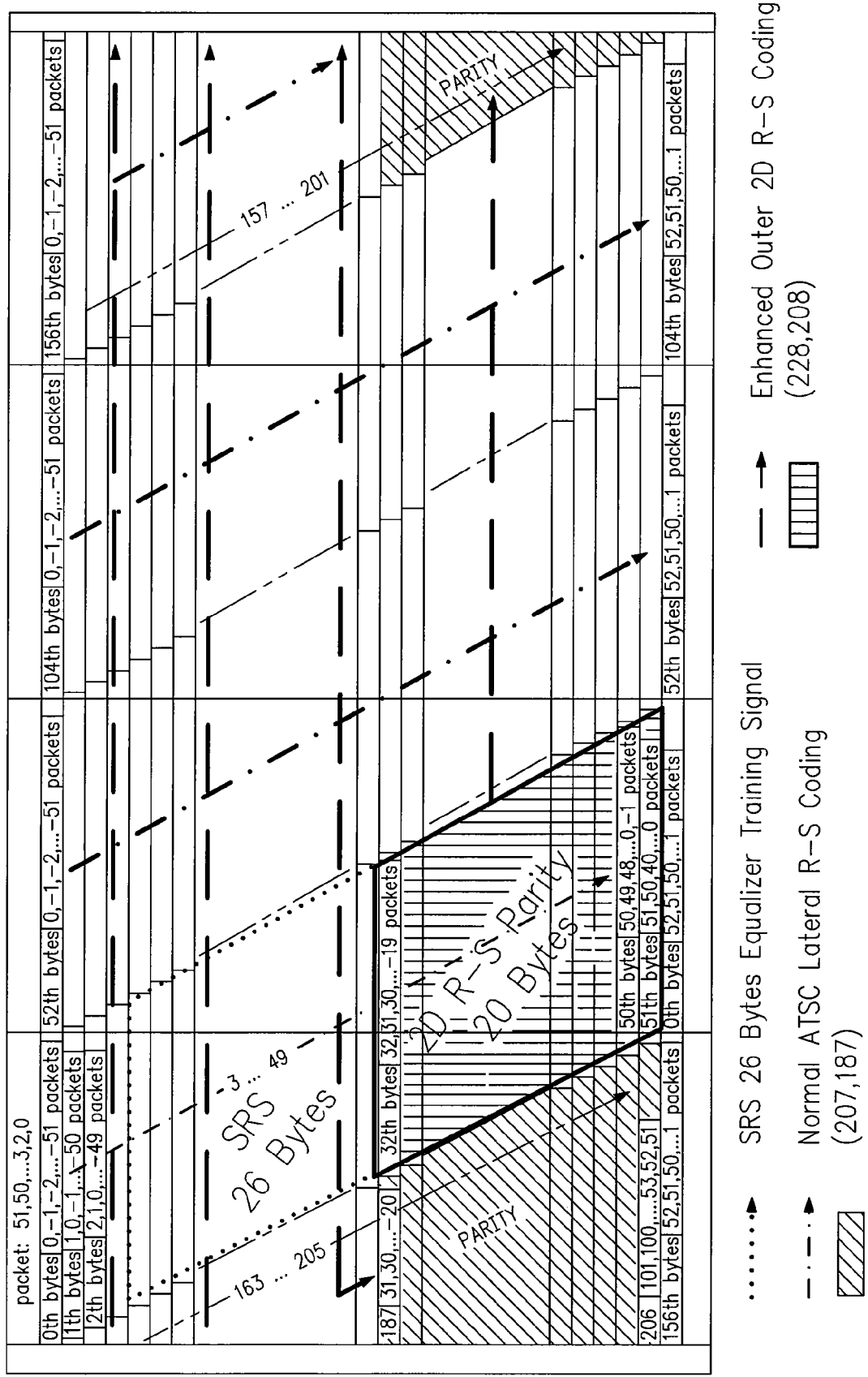
FIG. 17 depicts the memory map of a convolutional byte interleaver showing the dispersion of the parity and the dimension of encoding.

As shown in FIG. 15, 208 packets are shown which have been grouped into four (4) slices. The four slices are grouped into a block and transverse coding is applied to the block, where the parity bytes are placed within the block (2D R-S Parity). Emission multiplexer 504 can control time diversity by controlling where slices will be placed within a data frame as well as the particular data frame. For example, emission multiplexer 504 can control where each of the 4 slices shown in FIG. 15 will be inserted into frames by exciter 512, thus separating the slices by a predetermined time (e.g., placing the first slice of one frame into a frame five frames later and repeating the process every five frames). This provides virtual interleaving and strengthens the correction capability over bursty channels. The block of packets is then transmitted over distribution network 506 in the transport stream to the exciter 512, which in turn interleaves the block of packets. Also as is well known, the inner/inter-interleaving sparses the block in time. Referring to FIG. 17, the slices will thus appear in different groups of the interleaved data, with normal content between the groups. Since the mapping of interleaved data is deterministic, a receiver having the deterministic mapping can regroup and decode the original content. The blocks of packets can be interspersed throughout the transport stream either across a single data frame or across multiple data frames. In other words, the original content is not transmitted contiguously. This time diversity now possible by deterministic nature of VSB frame will help mitigate bursty channels.

Figure 16:
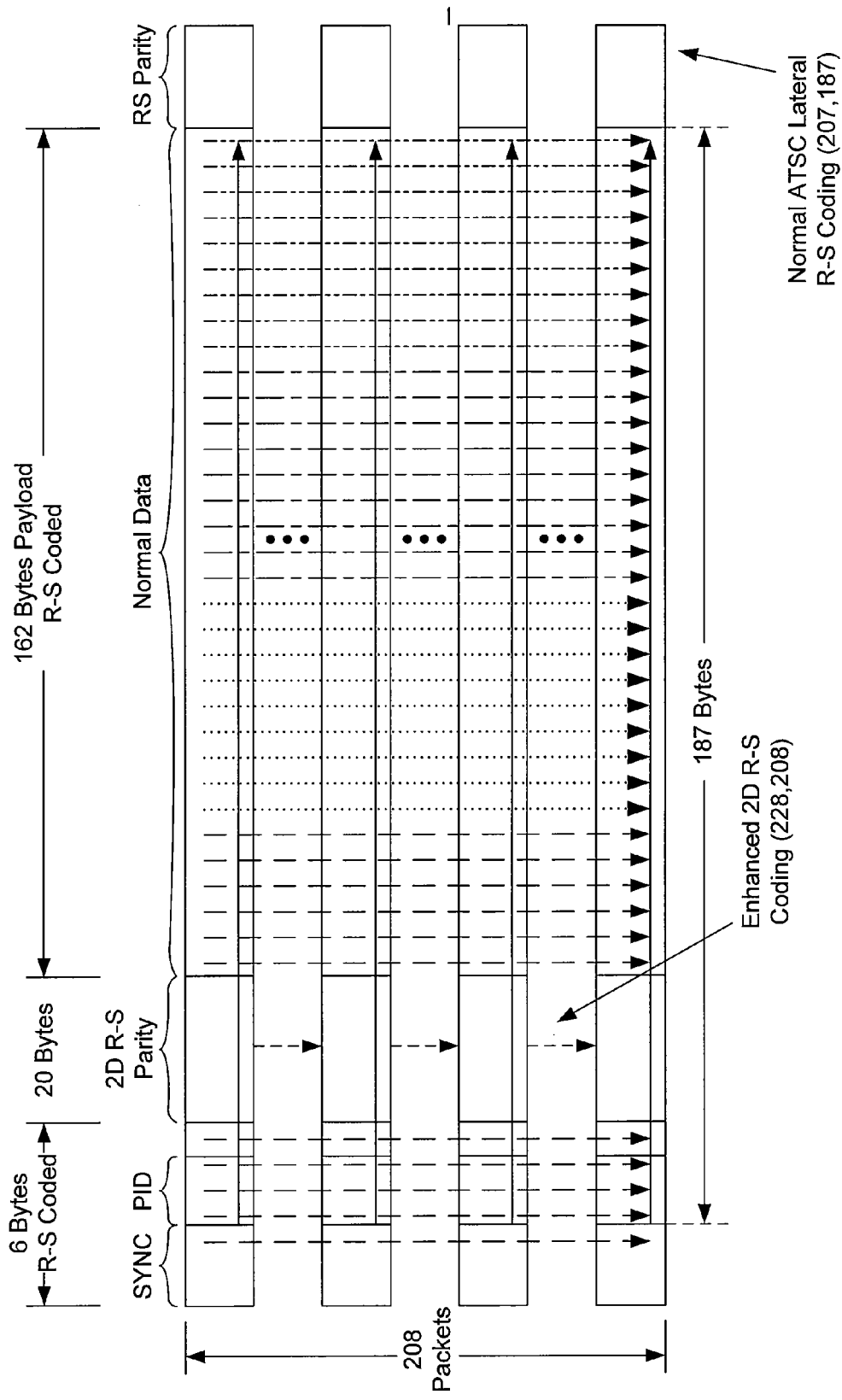
FIG. 16 illustrates the structure of segments after they have been encoded with additional forward error correction (FEC) coding and after normal RS coding from an ATSC modulator.

FIG. 16 illustrates the structure of segments after being encoded with additional FEC coding and after normal RS coding from exciter 512. As shown in FIG. 16, the normal ATSC lateral RS coding is appended to each segment (RS Parity). This two dimensional coding benefits from time diversity. Upon interleaving, the time diversity and dispersion provides an uncorrelated channel condition, thereby providing better protection against burst type channel errors.

FIG. 17 depicts the memory map of a convolutional byte interleaver showing the dispersion of the parity and the dimension of encoding. In particular, FIG. 17 shows the dispersion of the parity bytes and the arrows show the dimensions (i.e., lateral and transverse) in which they were encoded. As discussed above, the additional outer-level creates an uncorrelated channel condition (i.e., time diversity), the result of which is better protection against burst type channel errors. The dispersion of the bytes shown in FIG. 17 will change in accordance with the mapping performed by the interleaver. Accordingly, it should be understood that the mapping is conceptual and shows one exemplary interleaver mapping. Accordingly, other interleaver mappings of the data dispersion in accordance with other interleavers may be utilized and still be within the scope of this invention.

As described above, signaling is utilized to communicate available services and corresponding deterministic mappings. In one embodiment, this is accomplished by using a reserved area in the data field sync as described above. In another embodiment of the present invention, a signaling channel is created using spread spectrum, and the signaling information is carried through this channel. This can be accomplished by using the same CDMA spread spectrum technique used to carry an RF watermark to also carry the signaling information. Instead of using the CDMA channel to carry an RF watermark, the CDMA channel is used as a signaling channel carrying a syntax and semantic that point to the frame(s) and slice(s) of interest to the receiving devices so that they can capture content of interest. Such use of the CDMA channel is also referred to as "in band" spread spectrum signaling because it is transmitted by the VSB signal broadcast by an ATSC station running in accordance with the ATSC A/110 standard. Advantageously, the CDMA signaling technique can be applied to a single transmitter or SFN. In addition, in overlapping coverage areas, since CDMA allows multiple channels to be created within the same frequency spectrum, the data rate increases. Thus, the amount of data that can be delivered to receiving devices also increases.

In another embodiment of the present invention, a signaling channel is created by a service provider other than an ATSC broadcaster, such as a mobile (e.g., cellular) provider. This signaling method is provided out of the ATSC VSB communication channel's bandwidth and is referred to as an "out of band" signaling channel.

Figure 18:
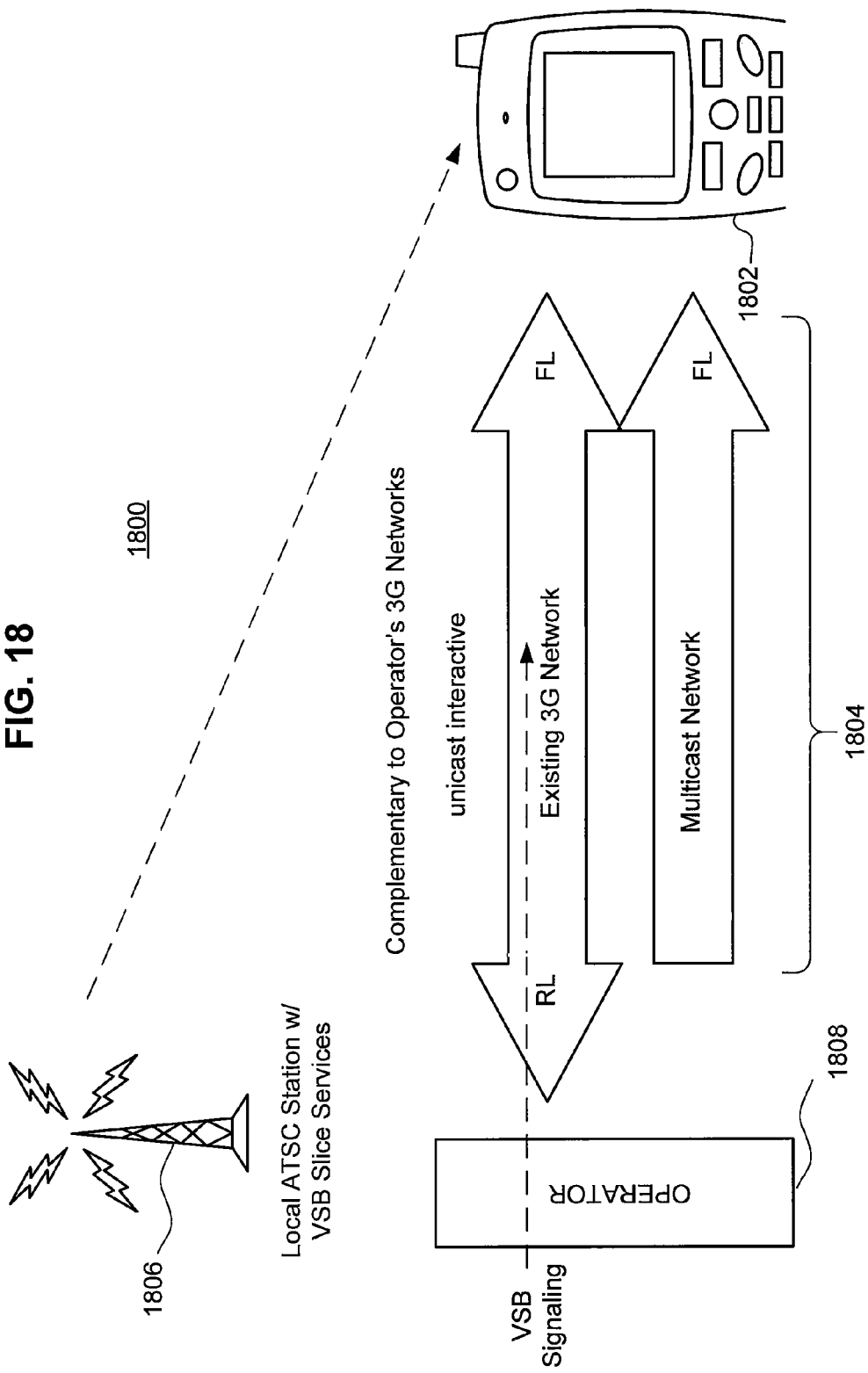
FIG. 18 depicts a handheld receiver receiving signaling information from both an ATSC broadcaster and a mobile telephone operator.

FIG. 18 depicts a receiving device 1802, such as handheld device, receiving signaling information from both an ATSC VSB broadcaster 1806 and another service provider operator 1808 such as a mobile telephone operator. Receiving device 1802 receives signaling information through any one of the above-described signaling channels. From the ATSC VSB broadcasting station, signaling information is received in a synchronization packet field, e.g., the reserved space in the frame sync, and/or via an in-band spread spectrum channel, e.g., a CDMA channel carrying a deterministic mapping. From a third party operator 1808, signaling information is received through an out-of-band signaling channel. Once the signaling information is fed to receiving device 1802, the device deterministically receives and filters content, such as streaming or clipped, audio and video multimedia from both the mobile telephone operator as well as the VSB frame slices from a broadcaster.

In addition, as shown in FIG. 18, signaling information 1804 can be provided by operator 1808 through a forward-link (FL) only multicast network or through a unicast interactive network, such as an existing third generation ("3G") network, which provides both forward link (FL) and reverse link (RL) communications channels.

It should be understood that other types of spread spectrum techniques such as direct sequence spread spectrum (DSSS), frequency hopping spread spectrum (FHSS), multi-code direct sequence spread spectrum (MC-DSSS), time division multiple access (TDMA), and the like, can be used to create a signaling channel for carrying signaling information, and still be within the scope of the present invention.

The above-described signaling techniques make it possible to receive signaling information from multiple sources and thus take full advantage of service offerings such as personalized services. Service discovery is improved in that either the ATSC broadcaster or a third party service provider can communicate the signaling information to a receiving device.

In yet another embodiment of the present invention, the signaling information can be used to provide emergency broadcast signals to receiving devices. Thus, in the event of an emergency, the signaling information itself can be appropriated to carry information or to provide the device with information as to when an emergency broadcast service will be communicated and provide the emergency broadcast data using the aforementioned frame slicing technique.

The present invention is not limited to multiple transmitter system and may be implemented in a single transmitter system. Frame synchronization was described above in terms of an SFN where a VFIP was used to performing frame synchronization and Trellis coder synchronization. A single transmitter system may not need Trellis coder synchronization. Accordingly, other forms of frame synchronization may be utilized to provide the deterministic mapping described above and still be within the scope of the present invention.

In another aspect of the present invention, time diversity is applied in conjunction with the frame slicing techniques described above to mitigate signal fades or drop outs of an RF signal as a mobile receiver moves though a reception environment. As described above, broadcast content intended for mobile receivers can be mapped within VSB frame slices. Once a complementary receiver is frame synchronized it is configured with a priori knowledge of when the enhanced data packets will arrive within a data frame. With this information, the receivers can detect, decode and use the service content to control the enhanced features or provide additional content.

Figure 23:
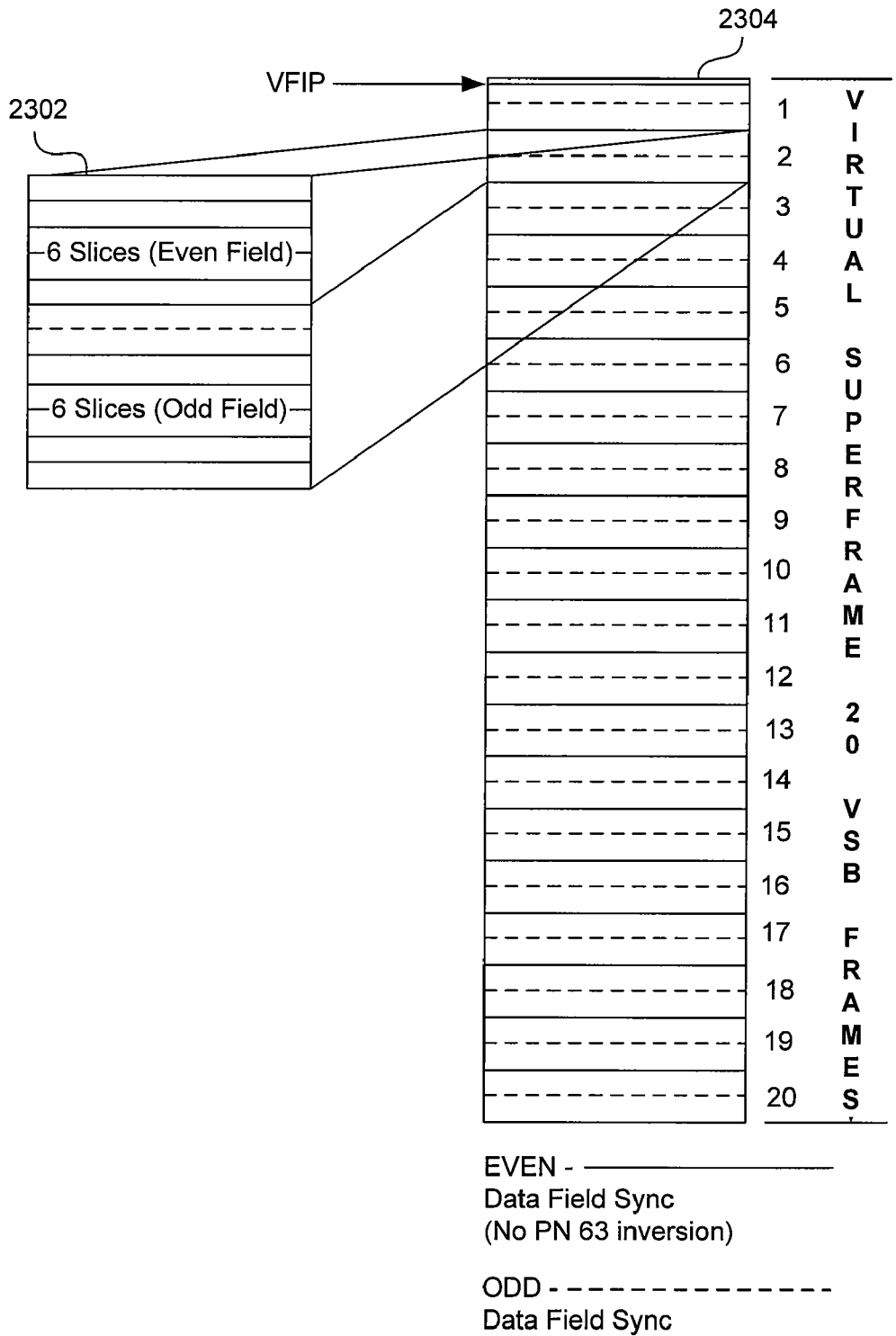
FIG. 23 depicts an exemplary synchronous VSB superframe in accordance with an embodiment of the present invention.

In this aspect of the present invention, a predetermined number of frame slices (e.g., 12 frame slices) are grouped into a data frame. In addition, a predetermined group of VSB frames (e.g., 20 VSB frames) are further grouped into what is referred to herein as a "virtual superframe" or simply superframe. FIG. 23 illustrates an exemplary structure of a superframe 2304 in accordance with an embodiment of the present invention. As shown, six slices are in the even fields of each frame and six slices are in the odd fields of each frame 2302. In addition, a VFIP packet is used to data frame sync the superframe 2304.

A superframe follows the frame synchronization timing of an emission multiplexer (e.g., block 504, FIG. 5) to achieve initial frame synchronization and to maintain this condition. As described above, an emission multiplexer has its data rate locked to a GPS reference 505, and initiates frame synchronization by selecting one of the TS packets to begin a VSB Frame. Once an initial TS packet has been selected to start the count, the emission multiplexer counts 623 TS packets inclusive of the selected packet (e.g., 0-622), and inserts a VFIP as the last (623) packet. This corresponds to a container of data (624 packets) which is equivalent to the payload in an ATSC A/53 VSB frame having 624 payload segments.

In turn, the emission multiplexer inserts a VSB frame initialization packet (VFIP). By the placement of VFIP in the last packet slot (623) signaling of a VSB frame is made implicit. Upon reception of the VFIP, each exciter is signaled to the start a new data frame after the last bit of VFIP packet is received. The cadence also referred to as timing or frame rate of the VSB frames is thus based on the frame synchronization timing which is maintained by an emission multiplexer. Since an emission multiplexer is locked to a GPS timebase, the 0-623 packet count becomes the cadence of the VSB frame rate. The same signaling indicates the beginning (and cadence) of a superframe.

In the example discussed herein, each frame slice contains 52 packets and each VSB frame contains 12 frame slices. A superframe includes 20 VSB frames, which equates to approximately a one-second long stream of data.

A stream of superframes are generated by a transport stream emitter (e.g., FIG. 5, block 504) and broadcast through an RF transmission system (e.g., FIG. 5, block 502). In addition, the transport stream emitter generates and transmits an identical copy of the mobile content within the superframe stream after delaying the transmission. As will be described in more detail below, the copy of the superframe may be generated by the same transport stream emitter or a different one. More particularly, the packet copying is performed by an emission multiplexer (e.g., by its processor). In addition, a delayed copy of the superframe may be broadcast from the same or different RF transmission system.

A receiver receives the original and the delayed slices from the superframes and deterministically buffers the original slices from the superframes. A synchronization combiner ("sync combiner") compares the original slice content and a delayed copy of the original slice and replaces any missing data or data received with errors with the copy of original slice data stored in the buffer, if necessary. Since the original slice of mobile content and its copy are separated in time by 4 superframes, the channel conditions at these two instants of time at a mobile receiver in motion will be normally uncorrelated under most conditions. Advantageously, packet errors that would typically overrun the forward error correction (FEC) decoder at one point in time or cause a complete signal dropout can thus be mitigated using deterministic frame slicing with time diversity.

Exemplary embodiments of the above-described frame slicing techniques implemented to provide time diversity will now be described in more detail.

Figure 19:
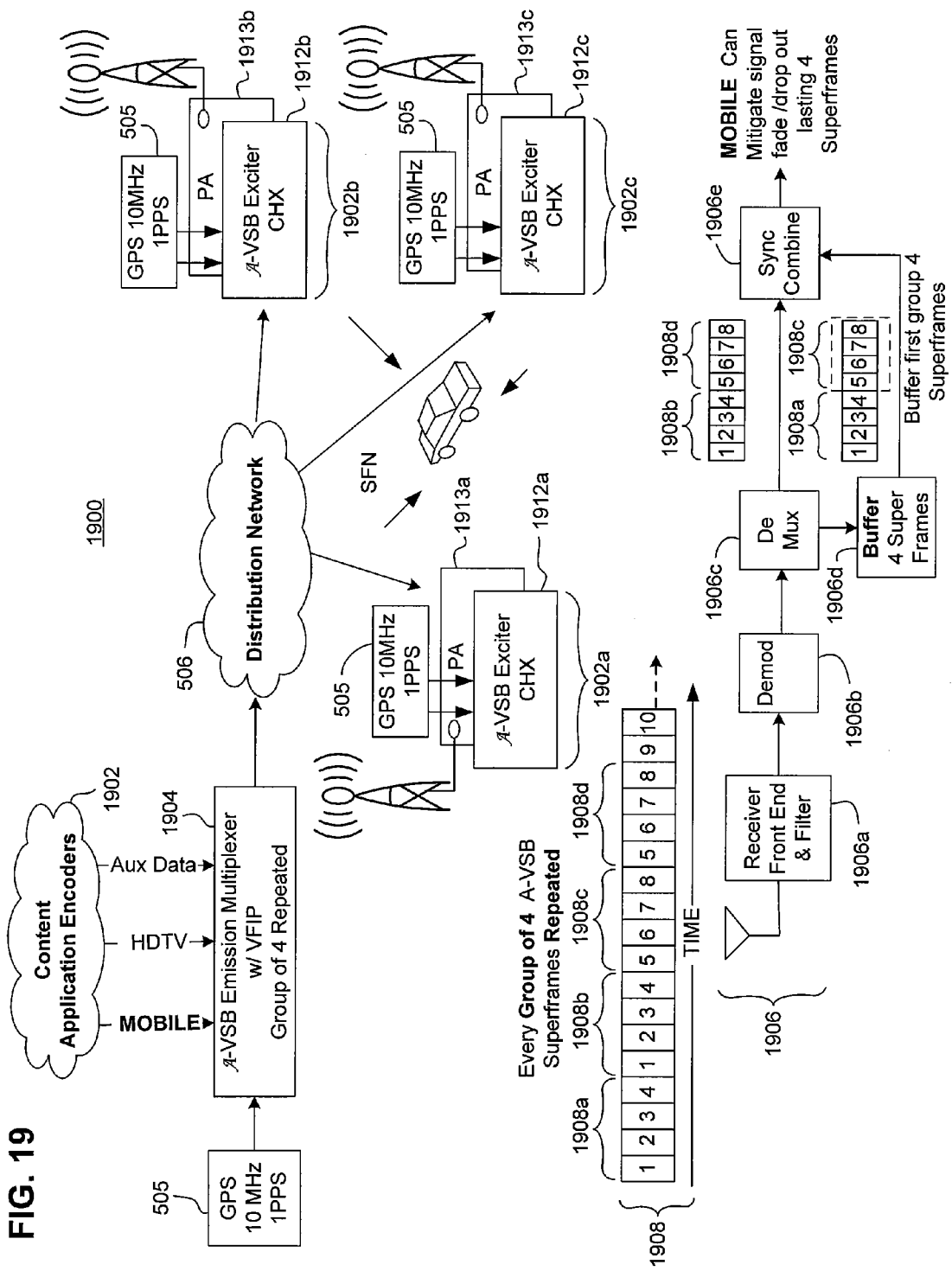
FIG. 19 depicts a system for providing space and time diversity in a mobile environment in accordance with an embodiment of the present invention.

FIG. 19 depicts a system 1900 for providing space and time diversity in a mobile environment in accordance with an embodiment of the present invention. Content application encoders 1902 feed compressed transport streams to an emission multiplexer 1904. These transport streams contain signals carrying mobile, HDTV, as well as auxiliary data, and the like.

Emission multiplexer 1904 generates one or more VSB frames from the transport stream. Using the frame slicing and signaling techniques discussed above (e.g., with respect to FIGS. 7-18), the mobile content is deterministically mapped into VSB slices within VSB frames.

The VSB data frames are further grouped into a VSB virtual superframes (1, 2, 3, 4, etc. in block 1908). Normal data content (e.g., HDTV content and auxiliary data) also is carried within the superframe stream 1908 within frame slices that are not occupied by the mobile content. Normal data content does not have a deterministic pattern nor is it repeated or copied and transmitted to receivers. Hence, a normal receiver, such as an HDTV receiver (not shown), receives and processes the normal content portion of a superframe as usual at the same time a broadcaster delivers a mobile service. A legacy receiver would simply drop or ignore the mobile service signals, thus making this aspect of the present invention backward compatible as well.

In the exemplary embodiment depicted in FIG. 19, the mobile content is inserted by emission multiplexer 1904 into groups of four superframes. In particular, the mobile content is placed into certain slices within every frame within the four superframes. These four superframes are then transmitted through RF Transmission networks 1902a, 1902b and 1902c via distribution network 506 as a data stream of superframes 1908.

SFN system 1900 further includes a mobile receiver 1906 having a receiver front end and filter 1906a which is configured to receive the transmission from RF transmission systems 1902a, 1902b and 1902c. As shown each RF transmission system includes an exciter 1912a, 1912b, and 1912c, as well as a corresponding power amplifier 1913a, 1913b, and 1913c. In addition, all the components have a GPS receiver/timebase 505 which provides an accurate timebase.

Receiver 1906 further demodulates and demultiplexes the received superframe stream 1908 using demodulator 1906b and demultiplexer 1906c, respectively. The first group of four superframes 1908a, is demultiplexed and the mobile content is buffered in a buffer 1906d. In one embodiment, buffer 1906d is a first-in-first-out (FIFO) buffer. The second group of four superframes 1908b contains an identical copy of a delayed version of the mobile content (i.e., the same frame slices that carried the original mobile content). This delayed mobile content is sent to a sync/combine unit 1906e after being received and demultiplexed.

Not all frame slices are copied or repeated in the subsequent 4 superframes, only the slices carrying mobile content. For example, normal HDTV or normal handheld data carried via frame slices are not repeated and progress in a normal linear fashion.

Sync/combine unit 1906e compares the first and second sets of superframe slice packets (1908a and 1908b), and repairs the signals by substitution if any of the data packets have been lost or cannot be corrected. The MPEG-2 TS packet continuity counter, described in the MPEG2 and ATSC A/53 standards, both of which are incorporated herein by reference, indicates whether a packet has been lost. If the packets are correct or the packet errors can be corrected, as indicated by an MPEG TS error flag bit which is set by the decoder in the receiver (also as defined in the MPEG-2 and ATSC A/53 standards), the second group of four superframe mobile content is passed through the sync/combiner 1906e and fed to content decoders (not shown). Similarly, the third group of four superframes 1908c carrying mobile slice data are stored in buffer 1906d and compared to the later (i.e., delayed) received mobile content from the fourth group of four superframes 1908d, and repaired if necessary.

In one embodiment of the present invention, buffer 1906d stores up to four identical copies of the mobile content which can be substituted (or used) by the sync/combine block 1906e in case of unrecoverable errors in FEC or complete loss of signal containing up to 4 superframes. These 4 superframes equate to approximately 4 seconds of transmission. Those skilled in the art will recognized that the size of superframes can be modified and still be within the scope of the invention.

Figure 20:
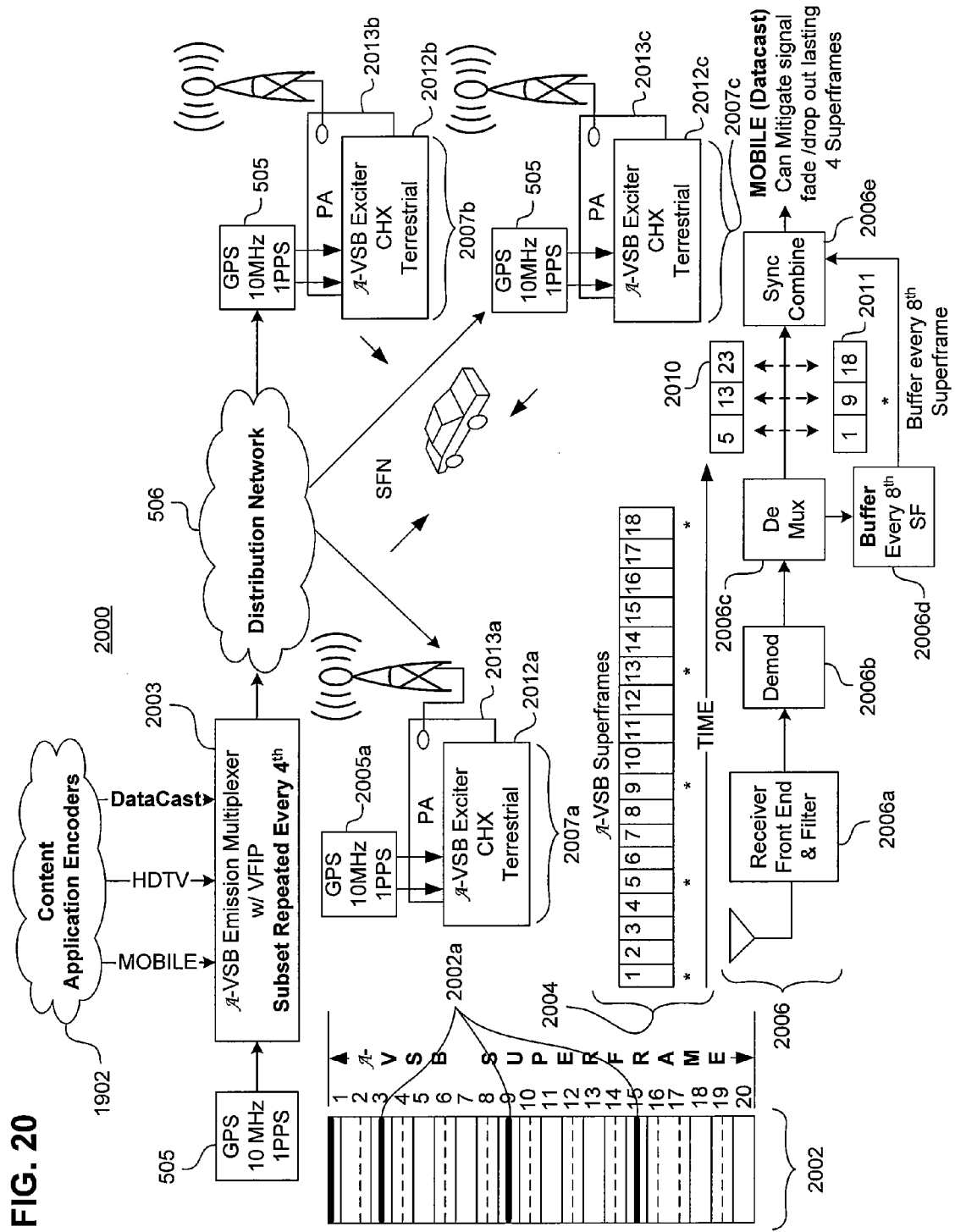
FIG. 20 depicts a system for providing space and time diversity in a mobile environment using a subset of a superframe in accordance with another embodiment of the present invention.

FIG. 20 depicts a system 2000 for providing space and time diversity in a mobile environment using a subset of a superframe in accordance with another embodiment of the present invention. In this aspect of the present invention, data content, such as datacasting data content having news, weather, sports information, and the like, is created by content application encoders 1902 and inserted into slices within a subset of frames 2002a. Slices of VSB frames are multiplexed by multiplexer 2003 to generate superframes as discussed above with respect to FIG. 19. Only a subset of the 20 frames that constitute a superframe are used instead of using each frame. Thus, low data rate mobile services can be run independently or in combination with higher data rate streaming mobile services. In turn, multiplexer 2003 communicates the superframes including the subset of frames 2002a via distribution network 506 to RF transmission systems 2007a, 2007b and 2007c (each of which includes an exciter 2012a, 2012b, 2012c, power amplifier 2013a, 2013b, 2013c and GPS receiver 505, respectively). In turn, RF transmission systems 2007a, 2007b and 2007c broadcast a stream of superframes 2004 to a mobile receiver 2006. Thus, instead of repeating mobile content in slices of every frame of a superframe, only certain data frame slices are repeated deterministically, particularly, those data frames having the frame slices which carry the datacast content.

In the exemplary embodiment depicted in FIG. 20, the datacast content is deterministically placed only in certain deterministic slices within frames 3, 9 and 15 of the superframe (2002a). These deterministic frame slices are repeated and thus benefit from time diversity. In this embodiment each VSB frame includes 12 slices and there are 20 frames per superframe for a total of 240 VSB frame slices. A subset as few as one slice per superframe can be repeated, for example every 4 superframes, to provide a low data rate datacast service.

The remaining frame slices can be used for other content. Thus, the present invention provides for time diversity for one or more preselected service channels (e.g., datacasting and mobile video content), where each service channel has a configurable and deterministic time diversity.

Receiver 2006 receives a stream of superframes 2004 using the receiver's front end and filter 2006a, and demodulates the superframes using demodulator 2006b. Demultiplexer 2006c demultiplexes the superframes and stores only every nth (e.g., $8^{th}$) superframe deterministic slice into buffer 2006d. In this example, superframes 1, 9 and 18 (2011) slices are stored in buffer 2006d.

The superframes carrying a delayed version of the original datacast signals, for example superframes 5, 13 and 23 (2010), are demodulated and the slice content is demultiplexed and communicated directly to a synchronization combiner 2006e. Synchronization combiner 2006e compares the buffered superframe slice content with the delayed superframe slice content and corrects any lost or corrupted packets.

Figure 21:
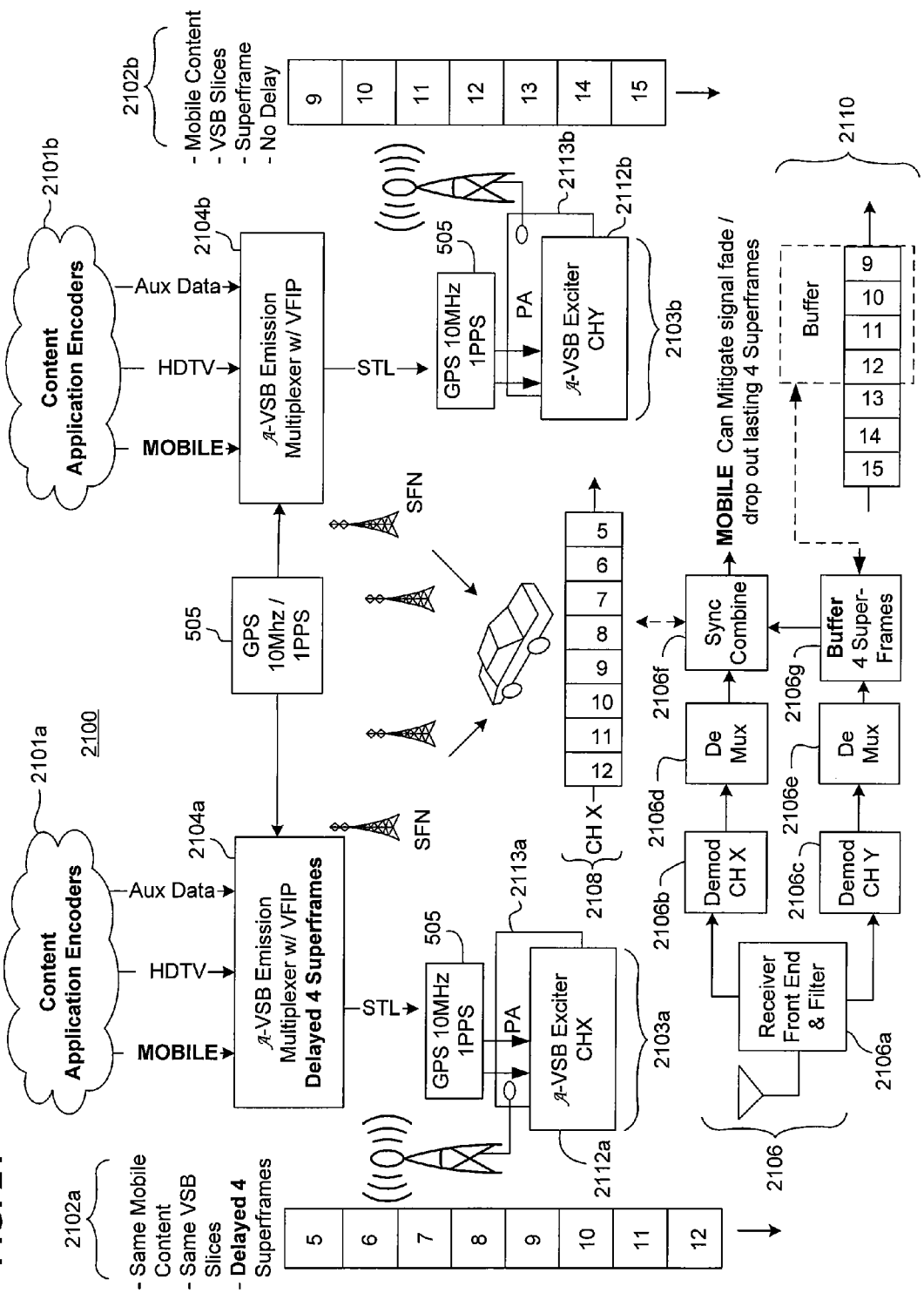
FIG. 21 depicts a system for providing frequency, space and time diversity in a mobile environment in accordance with another embodiment of the present invention.

FIG. 21 depicts system 2100 for providing frequency, space and time diversity in a mobile environment in accordance with another embodiment of the present invention. In this embodiment two content application encoders 2101a and 2101b supply the same mobile content having frequency, space and time diversity. Two RF transmission systems 2103a and 2103b (including exciters 2112a, 2112b, power amplifiers 2113a, 2113b, and GPS receivers 505, respectively) provide two DTV channels to create frequency diversity as well as time diversity. The channels have different UHF DTV channel frequencies, ChX and ChY. This configuration can be utilized, for instance, in situations where broadcasters have the opportunity to transmit through multiple DTV stations such as when a broadcaster owns two DTV stations or in the case where two broadcasters enter an agreement to share deterministic slices through their RF transmission systems. Only the mobile content is identical and time synchronous between the two stations, all other content, e.g., HDTV, is independent.

The identical mobile contents is synchronously inserted by the emission multiplexers (2104a, 2104b) at each station and broadcast, each of which has a GPS receiver 505. In the exemplary embodiment depicted in FIG. 21, slices of mobile content received from ChX are delayed by four superframes by the emission multiplexer 2104a.

System 2100 further includes a receiver 2106 capable of receiving both transmission channels. In particular, receiver 2106 includes a receiver front end and filter 2106a capable of receiving frequency diverse transmissions. Receiver 2106 also includes two demodulators 2006b and 2006c and two demultiplexer 2106d and 2106e for demodulating and demultiplexing the frequency diverse channels (ChX and ChY), respectively. The demultiplexed slice output from CH Y is buffered in buffer 2106g. Multiplexer 2104a delays broadcast of a copy of the superframes having a copy of the mobile content. After the delay has passed, multiplexer 2104 transmits the delayed superframes 2102a through RF transmission system 2103a (including exciter 2112a, power amplifiers 2113a, and GPS receiver 505).

After receiver 2106 receives the delayed ChX superframe data streams 2102a, the data streams 2102a are demodulated by demodulator 2106b and then demultiplexed by demultiplexer 2106d, the processed mobile slices 2108 are sent to the sync/combine block 2106f, where they are repaired, if necessary. Finally, the mobile data streams are communicated to one or more mobile content decoders (not shown). Thus, buffer 2106g stores four superframes of original slice data stream 2102b (2110) to provide time diversity to mitigate a loss of four superframes. Advantageously, time diversity along with frequency and space diversity, adds to quality of service delivered to mobile receivers in accordance with the present invention.

Figure 22:
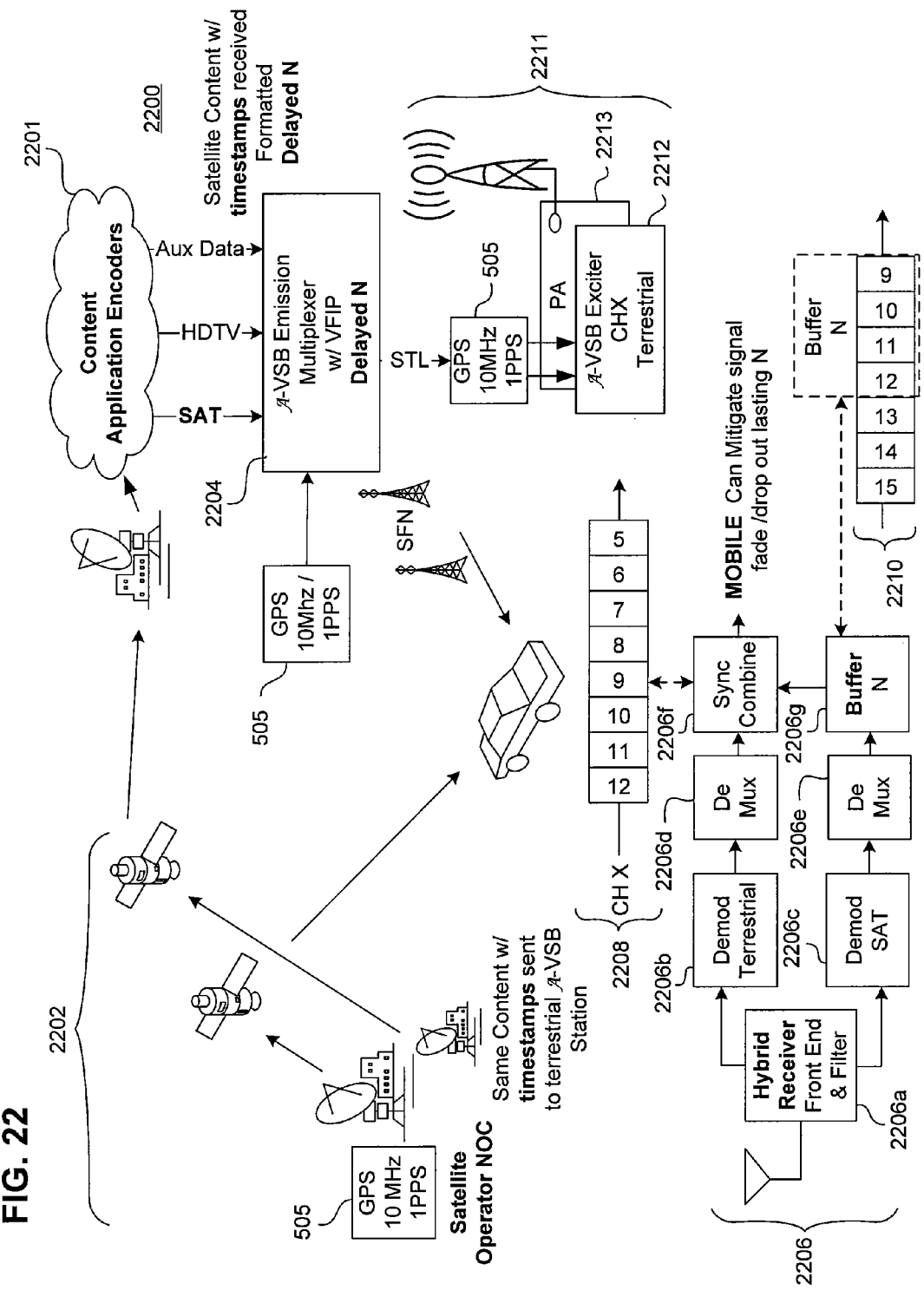
FIG. 22 depicts a system for providing modulation, frequency space and time diversity in a mobile environment in accordance with another embodiment of the present invention.

FIG. 22 depicts system 2202 for providing modulation, frequency, space and time diversity in a mobile environment in accordance with another embodiment of the present invention. In this embodiment, a hybrid mobile receiver 2206 is configured to receive signals from both a satellite service provider (or space segment) 2202 and a terrestrial VSB RF transmission system 2211. Both the space segment 2202 and the terrestrial VSB RF transmission system 2211 in an SFN are used together to improve the quality of mobile service. Both the satellite service provider 2202 and a terrestrial VSB RF transmission system 2211 are synchronized by a GPS receiver 505.

In this example identical content provided by content application encoders 2201 which is intended for mobile receivers is broadcast from satellite(s) and also relayed to terrestrial stations (e.g., RF transmission system 2211, which includes an exciter 2212 and a power amplifier 2213). In this embodiment, the transmission from the terrestrial RF transmission system 2211 is delayed by a multiplexer 2204 for time N.

System 2200 also includes a hybrid receiver 2206, which can receive a satellite transmission signal through its hybrid receiver front end and filter 2206a. Demodulator 2206c demodulates the received satellite signals and a demultiplexer 2206e separates the mobile content and stores into a buffer 2206g. In one embodiment, buffer 2206g is a FIFO buffer. The delayed terrestrial mobile signals are received by the hybrid receiver front end and filter 2206a and demodulated by demodulated 2206b and then demultiplexed by demultiplexer 2206d. The demultiplexed terrestrial mobile signals 2208 are transmitted to the sync/combine block 2206f. Buffer N 2206g allows the loss of a quantity of mobile content equal to time N to be mitigated. Once the data has been processed by sync/combine block 2206f and repaired, if necessary, then the mobile content is sent to a mobile content decoder (not shown). As shown in this embodiment, the terrestrial multiplexer 2204 delays transmission from the RF transmission system 2211 with respect to the satellite transmission system 2202. Alternatively, the satellite signal can be delayed with respect to the terrestrial VSB RF transmission system 2211 and the hybrid receiver 2206 terrestrial demultiplexer 2206d output is buffered by a buffer (not shown) to provide another method of time diversity.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for providing to a receiver a time diverse digital signal corresponding to a service, comprising the steps of:

receiving a digital signal containing a service content;

receiving a digital signal containing a non-deterministic content;

inserting the service content into a first predetermined number of data packets in a first predetermined number of data frames deterministically;
inserting a first portion of the non-deterministic content into a second predetermined number of data packets in the first predetermined number of data frames;
generating a copy of the first predetermined number of data packets;
broadcasting the first predetermined number of data frames over a distribution network;
inserting the copy of the first predetermined number of data packets into a second predetermined number of data frames;
inserting a second portion of the non-deterministic content into the second predetermined number of data frames; and
broadcasting the second predetermined number of data frames after a predetermined time.

2. The method according to claim 1, further comprising the step of:
inserting an initialization packet into the first frame of the predetermined number of data frames, the initialization packet indicating the beginning of the first predetermined number of data frames.

3. The method according to claim 1, further comprising the steps of:
deterministically spreading the service content over a predetermined number of the first predetermined number of data frames; and
deterministically spreading the copy of the first predetermined number of data packets over a predetermined number of the second predetermined number of data frames.

4. The method according to claim 1, wherein the service content is at least one of a mobile streaming service content and a mobile datacast content.

5. The method according to claim 1, further comprising the step of:
signaling a deterministic mapping of a service content corresponding to the service.

6. The method according to claim 1, further comprising the steps of:
receiving the first predetermined number of data frames;
buffering the first predetermined number of data packets;
receiving the second predetermined number of data frames;
comparing the first predetermined number of data packets of the first set of the predetermined number of data frames and the first predetermined number of data packets of the second set of the predetermined number of data frames; and
supplying a predetermined number of data packets to a service content application decoder based on the comparing.

7. The method according to claim 1, further comprising the steps of:
broadcasting the first set of the predetermined number of data frames from a first RF terrestrial transmission system; and
broadcasting the second set of the predetermined number of data frames from a second RF terrestrial transmission system.

8. The method according to claim 1, further comprising the steps of:
broadcasting at least one of the first set of the predetermined number of data frames and the second set of the predetermined number of data frames from a satellite service provider; and
broadcasting at least one of the first set of the predetermined number of data frames and the second set of the predetermined number of data frames from an RF terrestrial transmission system.

9. The method according to claim 1, wherein the first predetermined number of data packets is a slice of a data frame, and the first predetermined number of data frames is a superframe.

10. A method for receiving a time diverse digital signal corresponding to a service, comprising the steps of:
receiving a first digital signal containing a first predetermined number of data frames including a first predetermined number of data packets;
demodulating the first digital signal;
demultiplexing the first predetermined number of data frames;
buffering the first predetermined number of data packets of the first set of the predetermined number of data frames;
receiving a second digital signal containing a second predetermined number of data frames including a copy of the first predetermined number of data packets;
demodulating the second digital signal;
demultiplexing the second predetermined number of data frames;
comparing the first predetermined number of packets and the copy of the first predetermined number of packets; and
supplying a predetermined number of packets to a service content application decoder based on the comparing.

11. The method of claim 10, further comprising the step of:
performing an error correction operation using the first predetermined number of packets and the copy of the first predetermined number of packets.

12. The method of claim 10,
wherein the first digital signal is received from at least one of an RF terrestrial transmission system and a satellite service provider, and
wherein the second digital signal is received from at least one of an RF terrestrial transmission system and a satellite service provider.

13. An apparatus for providing a time diverse digital signal corresponding to a service, comprising:
a receiver operable to receive a digital signal containing a service content and a non-deterministic content;
a packet inserter operable to insert the service content into a first predetermined number of data packets in a first predetermined number of data frames deterministically and a first portion of the non-deterministic content into a second predetermined number of data packets in the first predetermined number of data frames;
a processor operable to generate a copy of the first predetermined number of data packets;
a transmitter operable to broadcast the first predetermined number of data frames over a distribution network, and
the packet inserter being further operable to insert the copy of the first predetermined number of data packets into a second predetermined number of data frames and to insert a second portion of the non-deterministic content into the second predetermined number of data frames, and the transmitter being further operable to broadcast the second predetermined number of data frames after a predetermined time.

14. The apparatus according to claim 13, wherein the packet inserter is further operable to insert an initialization packet into the first frame of the predetermined number of data frames, the initialization packet indicating the beginning of the first predetermined number of data frames.

15. The apparatus according to claim 13, wherein the packet inserter is further operable to deterministically spread the service content over a predetermined number of the first predetermined number of data frames, and deterministically spread the copy of the first predetermined number of data packets over a predetermined number of the second predetermined number of data frames.

16. The apparatus according to claim 13, wherein the service content is at least one of a mobile streaming service content and a mobile datacast content.

17. The apparatus according to claim 13, wherein the transmitter is further operable to signal a deterministic mapping of a service content corresponding to the service.

18. The apparatus according to claim 13, further comprising:
   a receiver operable to receive the first predetermined number of data frames and the second predetermined number of data frames;
   a buffer operable to buffer the first predetermined number of data packets of the first set of the predetermined number of data frames; and
   a synchronization combiner operable to compare the first predetermined number of data packets of the first set of the predetermined number of data frames and the first predetermined number of data packets of the second set of the predetermined number of data frames and to supply a predetermined number of data packets to a service content application based on a result of a comparison by the synchronization combiner.

19. The apparatus according to claim 13, further comprising:
   a first RF terrestrial transmission system operable to broadcast the first set of the predetermined number of data frames; and
   a second RF terrestrial transmission system operable to broadcast the second set of the predetermined number of data frames.

20. The apparatus according to claim 13, further comprising:
   a satellite service provider operable to broadcast at least one of the first set of the predetermined number of data frames and the second set of the predetermined number of data frames; and
   an RF terrestrial transmission system operable to broadcast at least one of the first set of the predetermined number of data frames and the second set of the predetermined number of data frames.

21. The apparatus according to claim 13, wherein the first predetermined number of data packets is a slice of a data frame, and the first predetermined number of data frames is a superframe.

22. A receiver for receiving a time diverse digital signal corresponding to a service, comprising:
   a receiver front end and filter operable to receive a first digital signal containing a first predetermined number of data frames including a first predetermined number of data packets and a second digital signal containing a second predetermined number of data frames including a copy of the first predetermined number of data packets;
   a demodulator operable to demodulate the first digital signal and the second digital signal and the second predetermined number of data frames;
   a demultiplexer operable to demultiplex the first predetermined number of data frames and the second predetermined number of data frames;
   a buffer operable to buffer the first predetermined number of data packets; and
   a synchronization combiner operable to compare the first predetermined number of packets and the copy of the first predetermined number of packets and to supply a predetermined number of packets to a service content application decoder based on a result of a comparison by the synchronization combiner.

23. The apparatus of claim 22, further comprising:
   an error correction unit operable to perform an error correction operation using the first predetermined number of packets and the copy of the first predetermined number of packets.

24. The apparatus of claim 22,
   wherein the first digital signal is received from at least one of an RF terrestrial transmission system and a satellite service provider, and
   wherein the second digital signal is received from at least one of an RF terrestrial transmission system and a satellite service provider.

25. An apparatus for providing a time diverse digital signal corresponding to a service, comprising:
   means for receiving a digital signal containing a service content and a non-deterministic content;
   means for inserting the service content into a first predetermined number of data packets in a first predetermined number of data frames deterministically and a first portion of the non-deterministic content into a second predetermined number of data packets in the first predetermined number of data frames;
   means for generating a copy of the first predetermined number of data packets;
   means for broadcasting the first predetermined number of data frames over a distribution network;
   means for inserting the copy of the first predetermined number of data packets into a second predetermined number of data frames and for inserting a second portion of the non-deterministic content into the second predetermined number of data frames; and
   means for broadcasting the second predetermined number of data frames after a predetermined time.

26. The apparatus according to claim 25, further comprising:
   means for inserting an initialization packet into the first frame of the predetermined number of data frames, the initialization packet indicating the beginning of the first predetermined number of data frames.

27. The apparatus according to claim 25, further comprising:
   means for signaling a deterministic mapping of a service content corresponding to the service.

28. A receiver for receiving a time diverse digital signal corresponding to a service, comprising:
   means for receiving a first digital signal containing a first predetermined number of data frames including a first predetermined number of data packets and a second digital signal containing a second predetermined number of data frames including a copy of the first predetermined number of data packets;

means for demodulating the first digital signal and the second digital signal and the second predetermined number of data frames;
means for demultiplexing the first predetermined number of data frames and the second predetermined number of data frames;
means for buffering the first predetermined number of data packets;

means for comparing the first predetermined number of packets and the copy of the first predetermined number of packets; and means for supplying a predetermined number of packets to a service content application decoder.

* * * * *